United States Patent
Zhang et al.

(10) Patent No.: US 8,605,947 B2
(45) Date of Patent: Dec. 10, 2013

(54) METHOD FOR DETECTING A CLEAR PATH OF TRAVEL FOR A VEHICLE ENHANCED BY OBJECT DETECTION

(75) Inventors: Wende Zhang, Shelby Township, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 12/581,838

(22) Filed: Oct. 19, 2009

(65) Prior Publication Data

US 2010/0104199 A1    Apr. 29, 2010

Related U.S. Application Data

(63) Continuation-in-part of application No. 12/581,659, filed on Oct. 19, 2009, which is a continuation-in-part of application No. 12/474,594, filed on May 29, 2009, which is a continuation-in-part of application No. 12/108,581, filed on Apr. 24, 2008.

(60) Provisional application No. 61/215,745, filed on May 8, 2009.

(51) Int. Cl.
*G06K 9/00*    (2006.01)

(52) U.S. Cl.
USPC ............. 382/104; 348/116; 348/148; 701/36

(58) Field of Classification Search
USPC ................ 382/104; 348/116, 148; 701/36
See application file for complete search history.

(56) References Cited

U.S. PATENT DOCUMENTS

| | | | |
|---|---|---|---|
| 7,188,012 B2 * | 3/2007 | Salmeen et al. | 701/45 |
| 7,376,262 B2 | 5/2008 | Hu | |
| 7,440,585 B2 | 10/2008 | Roh | |
| 7,797,107 B2 * | 9/2010 | Shiller | 701/301 |
| 8,112,225 B2 * | 2/2012 | Eidehall et al. | 701/301 |
| 8,401,782 B2 * | 3/2013 | Eidehall | 701/301 |
| 2004/0193374 A1 * | 9/2004 | Hac et al. | 701/301 |
| 2005/0271254 A1 * | 12/2005 | Hougen | 382/104 |
| 2006/0213714 A1 | 9/2006 | Igawa | |

(Continued)

FOREIGN PATENT DOCUMENTS

| | | |
|---|---|---|
| DE | 10 2005 062 151 B4 | 9/2007 |
| DE | 10 2006 047 131 A1 | 4/2008 |

(Continued)

OTHER PUBLICATIONS

Machine Translation of DE 10 2005 062 151.*

(Continued)

*Primary Examiner* — David Zarka
*Assistant Examiner* — Katrina Fujita

(57) ABSTRACT

Method for detecting a clear path of travel for a host vehicle including fusion of clear path detection by image analysis and detection of an object within an operating environment of the host vehicle including monitoring an image from a camera device, analyzing the image through clear path detection analysis to determine a clear path of travel within the image, monitoring sensor data describing the object, analyzing the sensor data to determine an impact of the object to the clear path, utilizing the determined impact of the object to describe an enhanced clear path of travel, and utilizing the enhanced clear path of travel to navigate the host vehicle.

21 Claims, 12 Drawing Sheets

(56) References Cited

U.S. PATENT DOCUMENTS

| | | |
|---|---|---|
| 2009/0268946 A1 | 10/2009 | Zhang et al. |
| 2009/0268948 A1 | 10/2009 | Zhang et al. |
| 2009/0295917 A1 | 12/2009 | Zhang et al. |
| 2010/0017060 A1 | 1/2010 | Zhang et al. |
| 2010/0097455 A1 | 4/2010 | Zhang et al. |
| 2010/0097456 A1 | 4/2010 | Zhang et al. |
| 2010/0097457 A1 | 4/2010 | Zhang et al. |
| 2010/0097458 A1 | 4/2010 | Zhang et al. |
| 2010/0098290 A1 | 4/2010 | Zhang et al. |
| 2010/0098295 A1 | 4/2010 | Zhang et al. |
| 2010/0098297 A1 | 4/2010 | Zhang |
| 2010/0100268 A1 | 4/2010 | Zhang et al. |
| 2010/0104137 A1 | 4/2010 | Zhang et al. |
| 2010/0114490 A1 * | 5/2010 | Becker .......................... 701/301 |
| 2010/0121577 A1 | 5/2010 | Zhang et al. |

FOREIGN PATENT DOCUMENTS

| | | | |
|---|---|---|---|
| DE | 102006047131 A1 * | 4/2008 | |
| DE | 10 2007 012 458 A1 | 9/2008 | |
| DE | 10 2007 027 297 A1 | 12/2008 | |
| JP | 2003189291 A | 7/2003 | |
| KR | 1020050069060 A | 7/2005 | |
| KR | 1020060021388 A | 3/2006 | |

OTHER PUBLICATIONS

U.S. Appl. No. 61/215,745.

Mallat, S., A Theory for Multi-Resolution Signal Decomposition: The Wavelet Representation, IEEE Transactions on Pattern Analysis and Machine Intelligence, 11, 1989, pp. 674-693.

Haar, A., Zur Theorie der orthogonalen Funktionensysteme, Mathematische Annalen, 69, 1910, pp. 331-371.

Daugman, J.G., Uncertainty Relations for Resolution in Space, Spatial frequency, and Orientation Optimized by Two-Dimensional Visual Cortical Filters, Journal of the Optical Society of America A, vol. 2, 1985, pp. 1160-1169.

Leung, T. and Malik, J., Representing and Recognizing the Visual Appearance of Materials Using Three Dimensional Textons, International Journal of Computer Vision, 43(1), Jun. 2001, pp. 29-44.

Burges, C. J.C., A Tutorial on Support Vector Machines for Pattern Recognition, 1998, pp. 1-43, Kluwer Academic Publishers, Boston.

Lucas, Bruce D., "An Iterative Image Registration Techique with an Application to Stereo Vision," Proceedings of Imaging Understanding Workshop, pp. 121-130 (1981).

Harris, Chris, "A Combined Corner and Edge Detector," 1988.

Lowe, David G., "Distinctive Image Features from Scale-Invariant Keypoints," International Journal of Computer Vision, Jan. 5, 2004.

* cited by examiner

METHOD FOR DETECTING A CLEAR PATH OF TRAVEL FOR A VEHICLE ENHANCED BY OBJECT DETECTION

CROSS REFERENCE TO RELATED APPLICATIONS

This application is a continuation-in-part of U.S. application Ser. No. 12/581,659 filed on Oct. 19, 2009, which is a continuation-in-part of U.S. application Ser. No. 12/474,594 filed on May 29, 2009, which is a continuation-in-part of U.S. application Ser. No. 12/108,581 filed on Apr. 24, 2008. U.S. application Ser. No. 12/581,659 filed on Oct. 19, 2009 claims the benefit of U.S. Provisional Application 61/215,745 filed on May 8, 2009. U.S. application Ser. No. 12/581,659, U.S. application Ser. No. 12/474,594, U.S. application Ser. No. 12/108,581, and U.S. Provisional Application 61/215,745 are incorporated herein by reference.

TECHNICAL FIELD

This disclosure is related to automated or semi-automated control of a motor vehicle.

BACKGROUND

The statements in this section merely provide background information related to the present disclosure and may not constitute prior art.

Autonomous driving systems and semi-autonomous driving systems utilize inputs regarding the road and other driving conditions to automatically control throttle and steering mechanisms. Accurate estimation and identification of a clear path over which to operate a motor vehicle is critical to successfully replacing the human mind as a control mechanism for vehicle operation.

Road conditions can be complex. Under normal operation of a vehicle, the human operator makes hundreds of observations per minute and adjusts operation of the vehicle on the basis of perceived road conditions. One aspect of perceiving road conditions is the perception of the road in the context of objects in and around the roadway and navigating a clear path through any objects. Replacing human perception with technology preferentially includes some means to accurately perceive objects, for example, including stationary objects such as roadside curbs and moving objects such as other vehicles, and road conditions, such as lane markers, potholes, or icy patches upon the roadway, and continue to effectively navigate around such navigational concerns.

Technological means for perceiving an object or road conditions include data from visual cameras, radar imaging, LIDAR, ultrasonic sensors, vehicle to vehicle communications, vehicle to infrastructure communications, and use of global positioning data with a digital map. Cameras translate visual images in the form of radiation such as light patterns or infrared signatures into a readable data format. One such data format includes pixelated images, in which a perceived scene is broken down into a series of pixels. Radar imaging utilizes radio waves generated by a transmitter to estimate shapes and objects present in front of the transmitter. Patterns in the waves reflecting off these shapes and objects can be analyzed and the locations of objects can be estimated.

Once data has been generated regarding the ground in front of the vehicle, the data must be analyzed to estimate the presence of objects or road conditions from the data. By using cameras, radar imaging systems, LIDAR, and other methods, ground or roadway in front of the vehicle can be analyzed for the presence of objects or road conditions that might need to be avoided. However, the mere identification of potential navigational concerns to be avoided does not complete the analysis. An important component of any autonomous system includes how potential navigational concerns identified in perceived ground data are processed and manipulated to identify a clear path in which to operate the vehicle.

One known method to identify a clear path in which to operate the vehicle is to catalog and provisionally identify all perceived navigational concerns and identify a clear path in light of the locations and behaviors of identified concerns. Images may be processed to identify and classify navigational concerns according to their form and relationship to the roadway. While this method can be effective in identifying a clear path, it requires a great deal of processing power, for example, requiring the recognition and separation of different objects in the visual image, for instance, distinguishing between a tree along the side of the road and a pedestrian walking toward the curb. Such methods can be slow or ineffective to process complex situations or may require bulky and expensive equipment to supply the necessary processing capacity.

SUMMARY

Method for detecting a clear path of travel for a host vehicle including fusion of clear path detection by image analysis and detection of an object within an operating environment of the host vehicle including monitoring an image from a camera device, analyzing the image through clear path detection analysis to determine a clear path of travel within the image, monitoring sensor data describing the object, analyzing the sensor data to determine an impact of the object to the clear path, utilizing the determined impact of the object to describe an enhanced clear path of travel, and utilizing the enhanced clear path of travel to navigate the host vehicle.

BRIEF DESCRIPTION OF THE DRAWINGS

One or more embodiments will now be described, by way of example, with reference to the accompanying drawings, in which.

DETAILED DESCRIPTION

Figure 1:
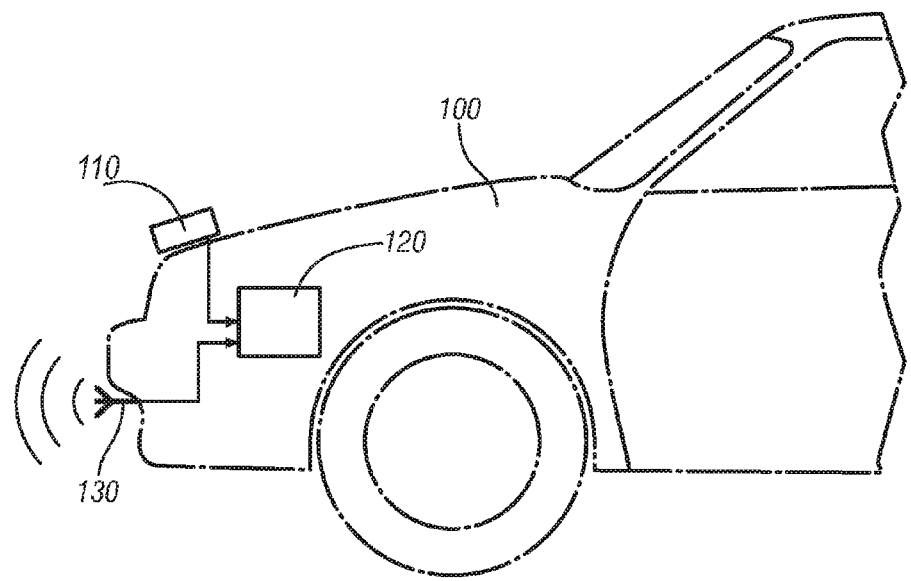
FIG. 1 illustrates an exemplary arrangement of a vehicle equipped with a camera and a radar imaging system in accordance with the disclosure.

Referring now to the drawings, wherein the showings are for the purpose of illustrating certain exemplary embodiments only and not for the purpose of limiting the same, FIG. 1 illustrates an exemplary arrangement of camera 110 located on the front of a vehicle 100 and pointed toward the ground in front of the vehicle 100 in accordance with the disclosure. Camera 110 is in communication with processing module 120 containing logic to process inputs from camera 110. The vehicle 100 may also be equipped with a radar imaging system 130, which, when present, is also in communication with processing module 120. It should be appreciated by those having ordinary skill in the art that the vehicle 100 could utilize a number of methods to identify road conditions in addition or in the alternative to the use of camera 110 and the radar imaging system 130, including GPS information, information from other vehicles in communication with the vehicle 100, historical data concerning the particular roadway, biometric information such as systems reading the visual focus of the driver, a radar imaging system, or other similar systems. The disclosure herein can be applied to various device arrangements and is therefore not limited thereby.

The camera 110 is a device well known in the art capable of translating visual inputs in the form of light, infrared, or other electro-magnetic (EM) radiation into a data format readily capable of analysis, e.g., a digital, pixelated image. In one embodiment, the camera 110 uses a charge coupled device (CCD) sensor to generate images indicating a field-of-view. Preferably, the camera 110 is configured for continuous image generation, e.g., 30 images generated per second. Images generated by the camera 110 may be stored in memory within the camera 110 or transferred to the processing module 120 for storage and/or analysis. Preferably, each image generated by the camera 110 is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model. Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

The radar imaging device 130 is a device well known in the art incorporating a transmitter capable of emitting radio waves or other EM radiation, a receiver device capable of sensing the emitted waves reflected back to the receiver from objects in front of the transmitter, and means to transfer the sensed waves into a data format capable of analysis, indicating for example range and angle from the objects off which the waves reflected. Alternatively, the radar imaging device 130 may be replaced or supplemented with a light detection and ranging (LIDAR) system configured to transmit and receive optical energy. The received optical energy may be used to determine object geometric dimensions and/or geometrical proximity to the vehicle 100. It will be noted that radar imaging device 130 is optional and unnecessary to perform many of the methods disclosed herein, wherein processing of visual images is capable of accomplishing clear path detection. The term "clear path" as used herein is to be given its ordinary and customary meaning to a person of ordinary skill in the art (and it is not to be limited to a special or customized meaning), and refers without limitation to a path free of objects exceeding a threshold.

The processing module 120 is illustrated in FIG. 1, and described herein as a discrete element. Such illustration is for ease of description and it should be recognized that the functions performed by this element may be combined in one or more devices, e.g., implemented in software, hardware, and/or application-specific integrated circuitry. The processing module 120 can be a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. In the alternative, processing module 120 can be a digital signal processing (DSP) unit, such as a customized integrated circuit such as a field programmable gate array. The processing module 120 has a set of processing algorithms, comprising resident program instructions and calibrations stored in the non-volatile memory and executed to provide desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The processing module 120 executes algorithmic code stored therein to monitor related equipment such as camera 110 and radar imaging system 130 and execute commands or data transfers as indicated by analysis performed within the processing module. Processing module 120 may include algorithms and mechanisms to actuate autonomous driving control by means known in the art and not described herein, or processing module 120 may simply provide information to a separate autonomous driving system. Processing module 120 is adapted to receive input signals from other systems and the operator as necessary depending upon the exact embodiment utilized in conjunction with the control module.

Figure 2:
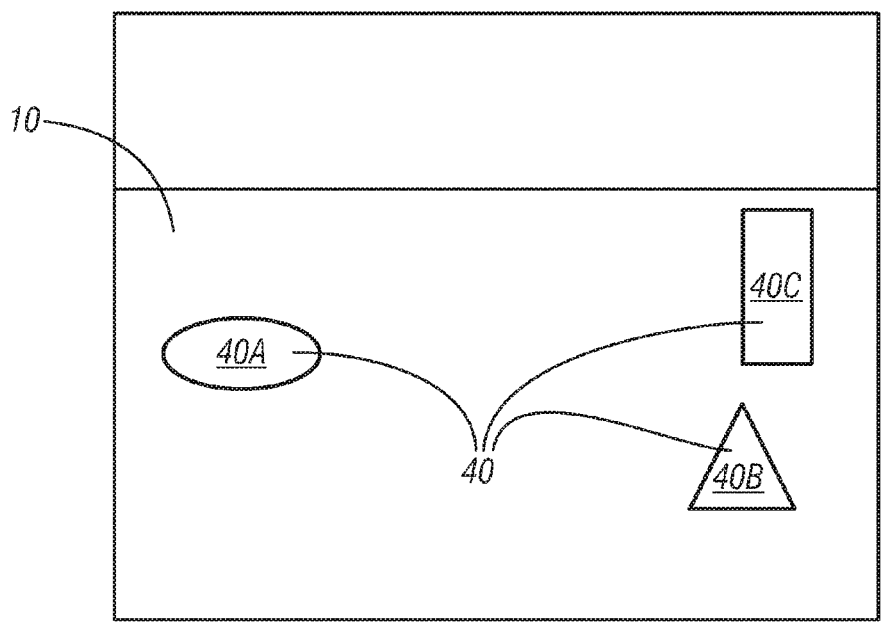
FIG. 2 illustrates a known method to determine a clear path for autonomous driving in accordance with the disclosure.

FIG. 2 illustrates a known method to determine a clear path for autonomous driving in accordance with the disclosure. Image 10 is generated corresponding to the roadway in front of vehicle 100. Through one of various methods, objects 40A, 40B, and 40C are identified within image 10, and each object is categorized and classified according to filtering and trained object behaviors. Separate treatment of each object can be computationally intensive, and requires expensive and bulky equipment to handle the computational load. An algorithm processes all available information regarding the roadway and objects 40 to estimate a clear path available to vehicle 100. Determination of the clear path depends upon the particular classifications and behaviors of the identified objects 40.

Figure 3:
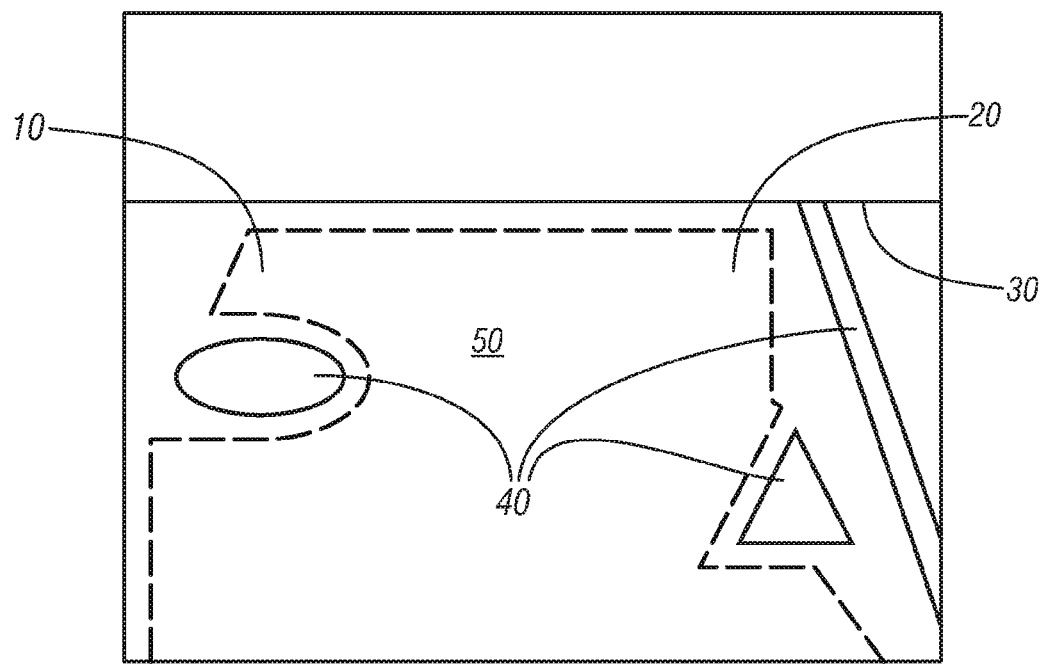
FIG. 3 illustrates an exemplary method to determine a clear path utilizing a likelihood analysis of an image in accordance with the disclosure.

FIG. 3 illustrates an exemplary method to determine a clear path for autonomous or semi-autonomous driving in accordance with the disclosure. Image 10 is depicted including ground 20, horizon 30, and objects 40. Image 10 is collected by camera 110 and represents the road environment in front of vehicle 100. Ground 20 represents the zone of all available paths open to travel without regard to any potential objects. The method of FIG. 3 that determines a clear path upon ground 20 starts by presuming all of ground 20 is clear, and then utilizes available data to disqualify portions of ground 20 as not clear. In contrast to the method of FIG. 2 which classifies every object 40, the method of FIG. 3 instead analyzes ground 20 and seeks to define a clear path confidence likelihood from available data that some detectable anomaly which may represent object 40 limits or makes not clear that portion of ground 20. This focus upon ground 20 instead of objects 40 avoids the complex computational tasks associated with managing the detection of the objects. Individual classification and tracking of individual objects is unnecessary, as individual objects 40 are simply grouped together as a part of the overall uniform limitation upon ground 20. Ground 20, described above as all paths open to travel without discrimination, minus limits placed on ground 20 by areas found to be not clear, define clear path 50, depicted in FIG. 3 as the area within the dotted lines, or an area with some threshold confidence likelihood of being open for travel of vehicle 100.

Object 40 that creates not clear limitations upon ground 20 can take many forms. For example, an object 40 can represent a discrete object such as a parked car, a pedestrian, or a road obstacle, or object 40 can also represent a less discreet change to surface patterns indicating an edge to a road, such as a road-side curb, a grass line, or water covering the roadway. Object 40 can also include an absence of flat road associated with ground 20, for instance, as might be detected with a large hole in the road. Object 40 can additionally include an indicator without any definable change in height from the road, but with distinct clear path implications for that segment of road, such as a paint pattern on the roadway indicative of a lane marker. The method disclosed herein, by not seeking to identify object 40 but by taking visual cues from ground 20 and anything in proximity to the ground in image 10, evaluates a clear path confidence likelihood of clear versus not clear and adjusts the control of vehicle 100 for the presence of any object 40.

Figure 4:
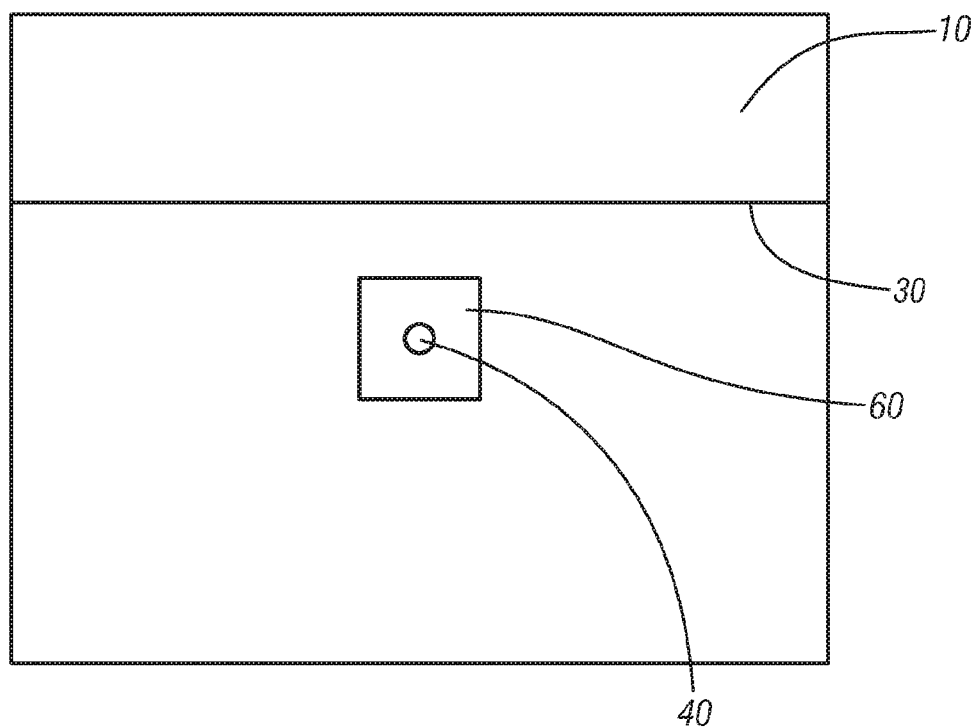
FIG. 4 illustrates an exemplary method to analyze an image in accordance with the disclosure.

Numerous methods for automated analysis of two-dimensional (2D) images are possible. Analysis of image 10 is performed by an algorithm within processing module 120. FIG. 4 illustrates one exemplary method which may be applied to analyze image 10 in accordance with the disclosure. This method subdivides image 10 and identifies a sub-image or patch 60 of ground 20 for analysis, extracts features or analyzes the available visual information from patch 60 to identify any interesting or distinguishing features within the patch, and classifies the patch according to a confidence likelihood of being a clear path according to analysis of the features. Patches with greater than a certain threshold of likeliness are classified as clear, and a compilation of patches can be used to assemble a clear path within the image.

Patch 60, as a sub-image of image 10, can be identified through any known means, such as random search or swarm search of image 10. Alternatively, information regarding the presence of an object 40 available from some other source of information, such as radar imaging system 130, can be used to identify a patch to analyze the portion of image 10 which should describe object 40. Image 10 may require many patches 60 to analyze the whole image. In addition, multiple overlaying patches or patches of different size could be used to fully analyze a region of image 10 containing information of interest. For instance, a small patch 60 might be used to analyze a small dot on the road; however, a large patch 60 might be required to analyze a series of dots which in isolation might seem uninteresting, but in context of the entire series, could indicate an object 40 of interest. In addition, the resolution of patches applied to a particular area may be modulated based upon information available, for instance, with more patches being applied to a region of image 10 wherein an object 40 is thought to exist. Many schemes or strategies can be utilized to define patches 60 for analysis, and the disclosure is not intended to be limited to the specific embodiments described herein.

Once a patch 60 has been identified for analysis, processing module 120 processes the patch by applying known feature identification algorithms to the patch. Additionally, processing module 120 may perform analysis of the location of the patch in context to the location of the vehicle. Feature identification algorithms search available visual information for characteristic patterns in the image associated with an object including features defined by line orientation, line location, color, corner characteristics, other visual attributes, and learned attributes. Feature identification algorithms may be applied to sequential images to identify changes corresponding to vehicle motion, wherein changes not associated with ground movement may be identified not clear path. Learned attributes may be learned by machine learning algorithms within the vehicle, but are most frequently programmed offline and may be developed experimentally, empirically, predictively, through modeling or other techniques adequate to accurately train distinguishing attributes.

Once features in patch 60 have been extracted, the patch is classified on the basis of the features to determine the confidence likelihood that the patch is a clear path. Likelihood analysis is a process known in the art by which a likelihood value or a confidence is developed that a particular condition exists. Applied to the present disclosure, classification includes likelihood analysis to determine whether the patch represents a clear path or if ground 20 in this patch is limited by an object 40. Classification is performed in an exemplary embodiment by application of classifiers or algorithms trained with a database of exemplary road conditions and interactions with detected objects. These classifiers allow processing module 120 to develop a fractional clear path likelihood value for patch 60, quantifying a confidence between zero and one that the features identified within the patch do not indicate a limiting object 40 which would inhibit free travel of vehicle 100. A threshold confidence can be set, defining the clear path likelihood required to define the patch as a clear path, for instance by the following logic:

$$\text{Confidence} = \text{ClearPathLikelihood}(i)$$

$$\text{If \_Confidence} > 0.5, \text{ then \_patch} = \text{clearpath} \qquad (1)$$

In this particular exemplary embodiment, a confidence of 50% or 0.5 is selected as the threshold confidence. This number can be developed experimentally, empirically, predictively, through modeling or other techniques adequate to accurately evaluate patches for clear path characteristics.

Figure 5:
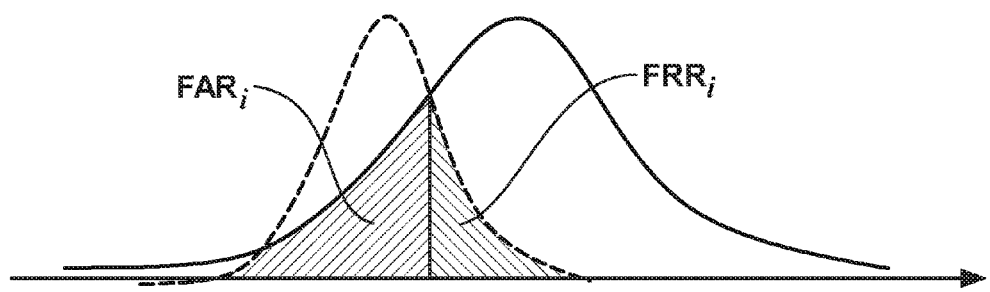
FIG. 5 illustrates an exemplary method to define a classification error by tuning a single threshold in accordance with the disclosure.

The likelihood analysis, as mentioned above, may be performed in one exemplary embodiment by application of trained classifiers to features extracted from a patch. One method analyzes the features a-priori using a training set of images. In this training stage, distinguishing features are selected from a raw feature set, the distinguishing features being defined by methods known in the art, such as Haar wavelet, Gabor wavelet, and Leung-and-Malik filter bank. In addition, 2D image location information based on each feature's minimal classification errors, calculated as the sum of false acceptance rate (FAR) and false rejection rate (FRR), may be utilized by tuning a single threshold as illustrated in FIG. 5. This classification error can be described through the following expression:

$$\text{ClassificationError}(i) = FAR_i + FRR_i \qquad (2)$$

Information from the trained classifiers is used to classify or weight the feature as indicating a clear path or not clear path, the particular classification depending upon the strength of comparisons to the trained data. Classification of the feature, if the feature is the only feature within the patch, may be directly applied to the patch. Classification of a patch with multiple features identified may take many forms, including the patch being defined by the included feature most indicative of the patch being not clear or the patch being defined by a weighted sum of all of the features included therein.

The above method can be utilized to examine an individual image 10 and estimate a clear path 50 based upon visual information contained within image 10. This method may be repeated at some interval as the vehicle travels down the road to take new information into account and extend the formulated clear path to some range in front of the vehicle's new position. Selection of the interval must update image 10 with enough frequency to accurately supply vehicle 100 with a clear path in which to drive. However, the interval can also be selected to some minimum value to adequately control the vehicle but also not to unduly burden the computational load placed upon processing module 120.

Clear path detection can be accomplished through a single image 10 as described above. However, processing speed and accuracy can be improved with the addition of a second image taken in close time proximity to the original image, such as sequential images from a streaming video clip. A second image allows direct comparison to the first and provides for updated information regarding progression of the vehicle and movement of detected objects. Also, the change of perspective of camera 110 allows for different analysis of features from the first image: a feature that may not have shown up clearly or was indistinct in the first image may display at a different camera angle, stand out more distinctly, or may have moved since the first image, allowing the classification algorithm an additional opportunity to define the feature.

Processing of a second image in relation to the original image 10 can be performed by calculating an image difference. If the image difference of a point of interest, such as a feature identified by radar, is not zero, then the point can be identified as embodying new information. Points where the image difference does equal zero can be eliminated from analysis and computation resources may be conserved. Methods to determine image difference include absolute image intensity difference and vehicle-motion compensated image difference.

Determining an image difference by calculating an absolute image intensity difference can be used to gather information between two images. One method of absolute image intensity difference includes determining equivalent image characteristics between the original image and the second image in order to compensate for movement in the vehicle between the images, overlaying the images, and noting any significant change in intensity between the images. A comparison between the images indicating a change in image intensity in a certain area contains new information. Areas or patches displaying no change in intensity can be de-emphasized in analysis, whereas areas displaying clear changes in intensity can be focused upon, utilizing aforementioned methods to analyze patches on either or both captured images.

Figure 6A:
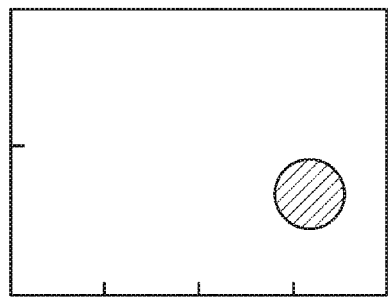
FIGS. 6A, 6B, and 6C illustrate an exemplary determination of an image difference by calculating an absolute image intensity difference in accordance with the disclosure.
Figure 6B:
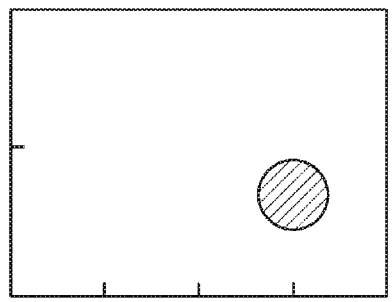
Figure 6C:
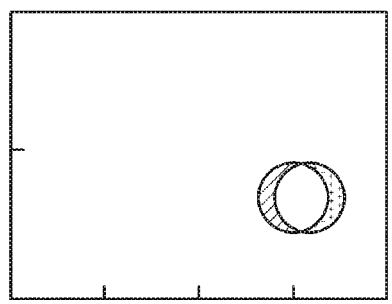

FIGS. 6A, 6B, and 6C illustrate an exemplary determination of an image difference by calculating an absolute image intensity difference in accordance with the disclosure. FIG. 6A depicts an original image. FIG. 6B depicts a second image with changes from the original image. In particular the depicted circular shape has shifted to the left. A comparison of the two images as illustrated in FIG. 6C, an output representing the result of an absolute image intensity difference comparison, identifies one region having gotten darker from the first image to the second image and another region having gotten lighter from the first image to the second image. Such a method can be described as differencing. Analysis of the comparison yields information that some change as a result of movement or change of perspective is likely available in that region of the images. In this way, absolute image intensity difference can be used to analyze a pair of sequential images to identify a potentially not clear path.

Likewise, determining an image difference by calculating a vehicle-motion compensated image difference can be used to gather information between two images. Many methods to calculate a vehicle-motion compensated image difference are known. One exemplary method of vehicle-motion compensated image difference includes analyzing a potential object as both a stationary portion of a clear path and a detected object at the same time. Likelihood analysis is performed on features identified corresponding to the potential object from both classifications at the same time, and the classifications may be compared, for example, through the following logic:

$$\text{Confidence}(i) = \text{ClearPathLikelihood}(i) - \text{DetectedObjectLikelihood}(i)$$

$$\text{If \_Confidence} > 0, \text{ then \_patch} = \text{clearpath} \qquad (3)$$

In this exemplary comparison, if confidence(i) is greater than zero, then the patch containing the feature is classified as a clear path. If confidence(i) equals or is less than zero, then the patch containing the feature is classified as not a clear path or limited. However, different values may be selected for the confidence level to classify the patch as a clear path. For example, testing may show that false positives are more likely than false negatives, so some factor or offset can be introduced.

Figure 7:
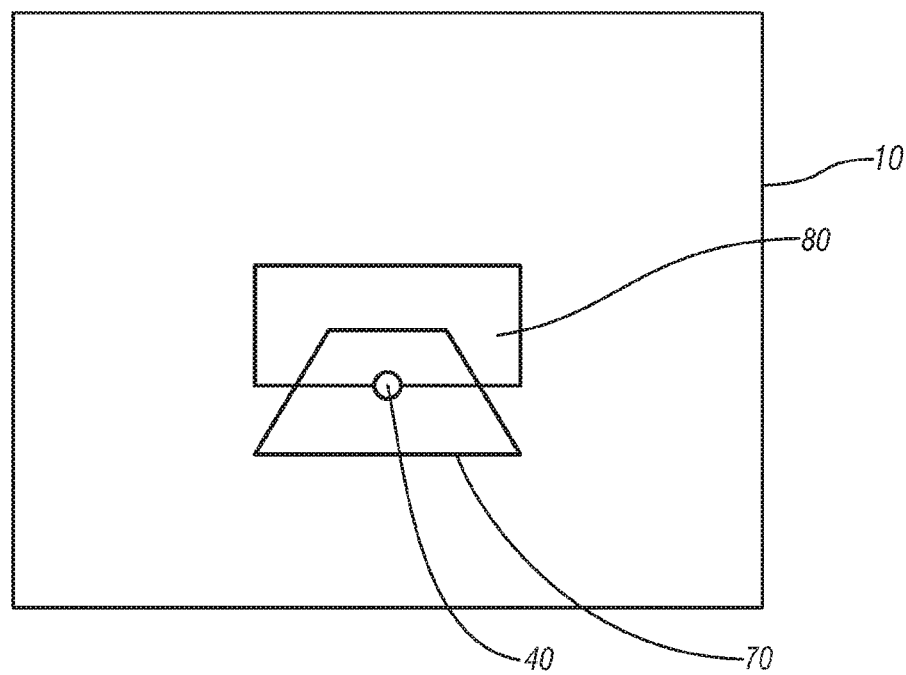
FIG. 7 illustrates an exemplary method to classify a feature as a portion of a clear path and as a detected object at the same time as a method of image analysis in accordance with the disclosure.
Figure 8:
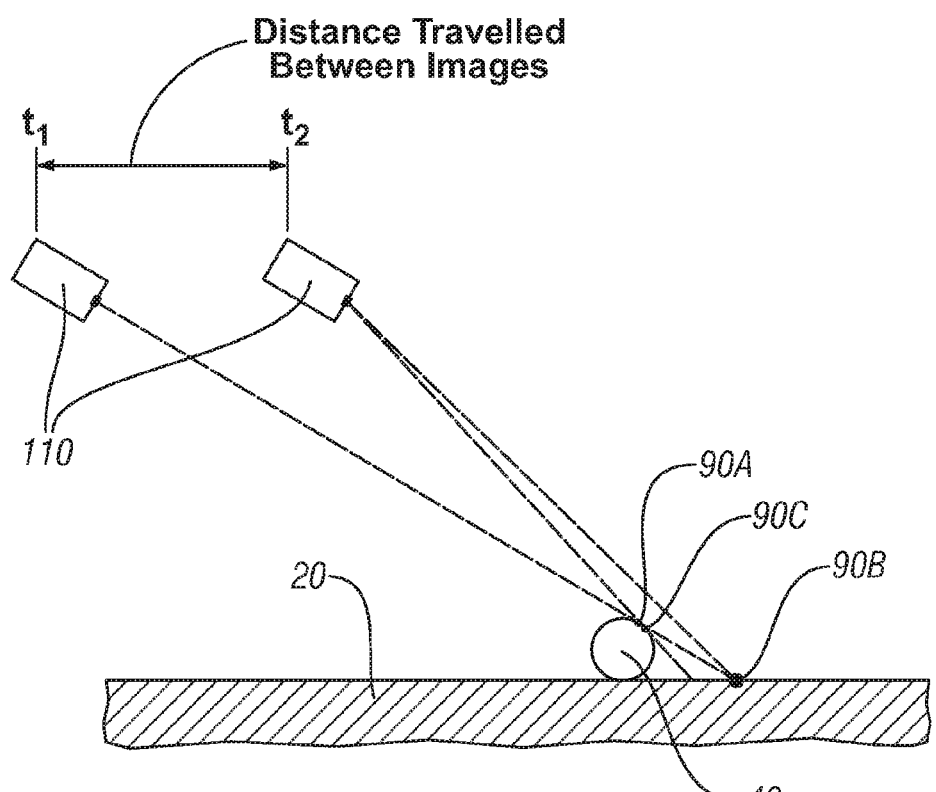
FIG. 8 further illustrates an exemplary method to classify a feature as a portion of a clear path and as a detected object at the same time as a method of image analysis in accordance with the disclosure.

FIG. 7 illustrates one method to classify a feature as a portion of a clear path and as a detected object at the same time as described above in accordance with the disclosure. Image 10 includes object 40, trapezoidal projection 70, and rectangular projection 80. This method utilizes an assumption projecting object 40 as a flat object on the ground within projection 70 to test the classification of the feature as a portion of a clear path. The method also utilized an assumption projecting object 40 as a vertical object within rectangular projection 80 to test the classification of the feature as a detected object. FIG. 8 illustrates comparisons made in data collected between the two images to evaluate the nature of object 40 in accordance with the disclosure. Camera 110 at time $t_1$ observes and captures data from object 40 in the form of a first image. If object 40 is an actual detected object, the profile observed by camera 110 of object 40 at time $t_1$ will correspond to point 90A. If object 40 is a flat object in the same plane as ground 20, then the profile observed by camera 110 of object 40 at time $t_1$ will correspond to point 90B. Between times $t_1$ and $t_2$, camera 110 travels some distance. A second image is captured at time t2, and information regarding object 40 can be tested by applying an algorithm looking at visible attributes of the object in the second image in comparison to the first image. If object 40 is an actual detected object, extending upward from ground 20, then the profile of object 40 at time $t_2$ will be observed at point 90C. If object 40 is a flat object in the same plane as ground 20, then the profile of object 40 at time t2 will be observed at point 90B. The comparison derived through vehicle-motion compensated image difference can directly assign a confidence by application of classifiers based on the observations of points 90, or the comparison may simply point to the area displaying change as a point of interest. Testing of the object against both classifications, as a flat object and as an actual detected object, allows either the area including object 40 to be identified for further analysis through analysis of a patch as described above or direct development of a clear path likelihood and a detected object likelihood for comparison, for example as in logic expression (3) above.

Information available from analysis of the second image can additionally be improved by integration of information regarding movement of the vehicle, such as speed and yaw-rate. Information regarding vehicle motion is available from a number of sources, including the vehicle speedometer, vehicle dynamic sensors or wheel speed sensors, anti-lock braking mechanisms, and GPS location systems. Algorithms may utilize this vehicle movement information, for example, in conjunction with the projections described in FIGS. 7 and 8 to project angles which should exist in a feature laying flat on the ground in the second image based upon data from the first image and the measured movement of the vehicle between the images.

The number of images utilized for comparison need not be limited to two. Multiple image analysis can be performed at multiple iterations, with an object being tracked and compared over a number of cycles. As mentioned above, computational efficiency can be gained by utilizing image difference analysis to identify points of interest and eliminating areas with zero difference from subsequent analyses. Such efficiencies can be used in multiple iterations, for example, saying that only points of interest identified between a first and second image will be analyzed in the third and fourth images taken. At some point, a fresh set of images will need to be compared to ensure that none of the areas showing zero difference have had any change, for example a moving object impinging upon a previously identified clear path. The utilization of image difference analyses and of focused analyses, eliminating areas identified with zero change, will vary from application to application and may vary between different operating conditions, such as vehicle speed or perceived operating environment. The particular utilization of image difference analyses and of focused analyses can take many different embodiments, and the disclosure is not intended to be limited to the specific embodiments described herein.

Multiple methods are herein disclosed for using the clear path detection analysis to identify a clear path including patch-based methods and pixel-based methods. The methods herein are preferably executed in the processing module 120, but may be combined in one or more devices, e.g., implemented in software, hardware, and/or application-specific integrated circuitry. Patch-based methods are described above and herein with reference to FIG. 9. Pixel-based methods are described herein with reference to FIGS. 11 and 12. It will be appreciated that pixel-based methods make decisions based upon pixel or a group of pixels. This decision for the component patch being analyzed can be based upon pixels contained within the patch, for example, with the patch being determined to be unclear if any or some minimum number of pixels within the patch are determined to be not clear. Exemplary pixel-based methods include textureless and texture-rich methods. Texture-rich methods analyze pixelated features in an image for distinct interest points based upon a contextual view within the image. The interest points are mapped corresponding to a field-of-view in from on the vehicle 100 and a clear path is determined based upon topography of the interest points within the map. Textureless methods filter from an image non-conforming regions of the image as not belonging to a planar, consistent road surface, remaining pixels correspond to the clear path. As described hereinabove, patch-based methods are computationally, relatively fast, while pixel-based methods are computationally, relatively slow.

Figure 9:
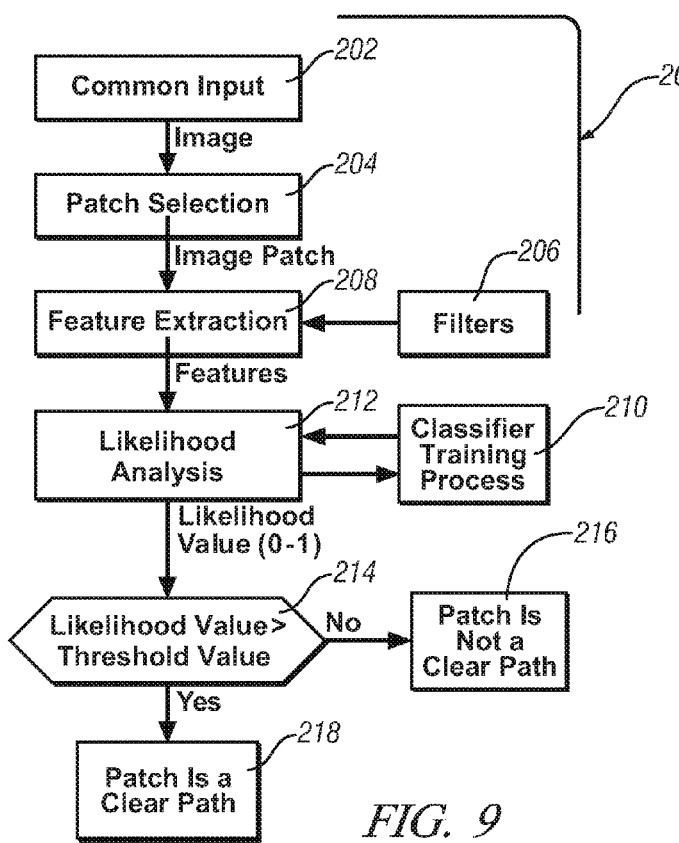
FIG. 9 is a flowchart for an exemplary patch-based method for detecting a clear path in accordance with the disclosure.

FIG. 9 illustrates an exemplary patch-based method 200 wherein input from a camera is analyzed to determine a clear path likelihood in accordance with the disclosure. The patch-based method 200 is illustrated in FIG. 9, and described herein as comprising discrete elements. Such illustration is for ease of description and it should be recognized that the functions performed by these elements may be combined in one or more devices, e.g., implemented in software, hardware, and/or application-specific integrated circuitry. For example, the patch-based method 200 may be executed as one or more algorithms in the processing module 120.

During operation, the camera 110 generates an image for analysis in the processing module 120 (202). The processing module 120 identifies patches in the image and selects a patch for analysis (204). Multiple methods for defining a plurality of patches sufficient to adequately analyze the image are contemplated by this disclosure. As described above, patches may be defined according to random search or swarm search methods. Alternatively, information from some other source of information, such as a radar imaging system, can be used to define a patch to analyze the portion of the image. In addition, multiple overlaying patches can be utilized based upon the perceived area of interest upon the image to be analyzed. Additionally, methods can be utilized to define patches according to anticipated road surface in front of the vehicle and resulting clear path patterns, for example, including a fixed-grid patch method, sectioning off some or all of the image according to a regular patch pattern, and a perspective patch method, similar to the fixed-grid patch method except that the patch sizes and/or shapes are modulated based upon a perspective view of the road and consideration for an amount of road surface contained within each of the patches. Such an anticipated road surface in front of the vehicle can be adjudged by an initial review of the input image, for example, utilizing clearly visible lines that could define lane boundaries as an initial reference to define a patch pattern. In another example, a patch pattern from an immediately previous iteration of the clear path method could be utilized and slowly modulated through the iterations, based upon the iteratively defined clear path and other indications that can be identified within the analyzed images.

The fixed-grid patch method identifies and divides the image into a plurality of patches based upon an area of interest and applies a fixed-grid pattern to the area of interest. The fixed-grid pattern sections substantially the entire area of interest in patches. The area of interest preferably encompasses the field-of-view immediately in front of the vehicle, however the area may be defined to encompasses more narrow fields-of-view. In one embodiment, the area of interest encompasses the field-of-view immediately in front of the vehicle and delimited by a horizon line or a vanishing point perceived for the roadway. The fixed-grid patch method can include patch tracking, identification, and analysis via a matrix, wherein each patch may be identified by a number of a number series.

The fixed-grid patch may be applied to the image using a number of methods. A first method includes applying the fixed-grid patch to sequential images using equal image coordinates. A second method includes applying the fixed-grid patch to the image using an identified interest point on the image, e.g., the horizon line. A third method includes applying the fixed-grid patch to the image compensating for vehicle movement, e.g., vehicle yaw.

The perspective patch method identifies and divides the image into a plurality of patches based upon field-of-view coordinates rather than image coordinates. An area of interest is identified as described hereinabove, wherein a perspective patch pattern is applied to the area of interest based upon estimated field-of-view coordinates, allocating patch size relative to an approximate area of ground covered by each patch. Such perspective patch definitions allow for a more detailed review of patches describing ground closer to the vehicle and less wasteful review of patches describing ground more distant from the vehicle. Patches can be aligned to the perceived lanes of travel upon the roadway, for example, as defined by lane markers and/or curbsides. Such patch definitions will frequently be trapezoidal, with the parallel sides of the trapezoids being parallel to the horizon or horizontal axis of the vehicle, and with the remaining sides of the trapezoids being dependent upon the defined road surface in the image view. Such a patch alignment is efficient to defining the road surface. However, computation of the grid of patches and the analysis of the patches is complicated by the many different shapes. The patches can instead be normalized to rectangle (or square) shapes, still parallel to the horizon or horizontal axis of the vehicle. Such rectangular patches are in ways less efficient in covering the road surface, for example, with portions of the curbside overlapping patches including actually clear roadway, but sufficient resolution of the patches and improved the computational efficiency can make such normalized perspective patches beneficial.

A filter or a set of filters may be applied to the selected patch (206), e.g., a lighting normalization filter. An exemplary normalization filter changes the range of pixel intensity values within the patch, thereby bringing the patch into a range that is more suitable for machine processes. For example, normalizing each pixel value to a zero mean and unit variance enhances the image contrast, specifically in a low lighting environments or when contrast is poor due to glare. A number of exemplary filters and filtering methods useful for image analysis are envisioned, and the disclosure is not intended to be limited to the particular exemplary embodiments described herein.

After filtering, feature extraction is executed on the selected patch using feature extraction algorithms (208). Feature extraction algorithms may analyze the selected patch for predetermined features, e.g., edges, corners, and blobs, and/or shapes, e.g., circles, ellipses, and lines. It will be appreciated that some features have meaning and others do not, and a process of feature selection can be utilized to identify a group of best features for analysis. A classifier training algorithm analyzes each feature and assigns a likelihood value (210). As mentioned above, classifiers or logic used in developing likelihood values are initially trained offline. Training may optionally be continued in the vehicle based upon fuzzy logic, neural networks, or other learning mechanisms known in the art. These trained classifiers perform a likelihood analysis (212) upon the features extracted, and a likelihood value for the patch is determined. This likelihood value expresses a confidence that the selected patch is clear.

The likelihood analysis may be augmented using spatially and/or temporally related patches to evaluate identified features during vehicle operation. When the feature extraction algorithm has identified a feature, the processing module 120 may spatially analyze the identified feature for consistency among adjacent or nearby patches. A feature identified in one patch may be compared to surrounding patches to determine if it is an aberration or consistent with the surrounding patches. A feature that is consistent with surrounding patches may be assigned a similar likelihood value to the surrounding patches, whereas a feature not consistent with surrounding patches can be assigned a different likelihood value. Similarly to the spatial analysis, when the feature extraction algorithm has identified a feature, the processing module 120 may temporally analyze the identified feature for consistency among temporally related patches, compensating for vehicle motion. For example, a feature analyzed in several frames and determined to have a high likelihood value through the image frames can be temporally compared to the same feature receiving a low likelihood value in a later frame. If the temporal analysis of the feature reveals new information, such as movement of the feature with respect to the roadway or increased perspective revealing the feature to be indicative of an object situated upon the road surface, then the lower likelihood value for the feature can be confirmed. If no new information is available, then the lower likelihood value for the feature in the present frame can be suspended as not necessarily indicating a not clear path. Subsequent frames can be analyzed similarly to establish the feature as significant or not. Similarly, according to methods described herein, the questionable feature can be analyzed with increased computational emphasis, either in the present image or in subsequent images.

The processing module 120 compares the likelihood value to a threshold likelihood value (214). If the likelihood value is greater than the threshold value, then the patch is identified as a clear path (218). If the likelihood value is not greater than the threshold value, then the patch is identified as a not clear path (216).

As described above, the patch-based method 200 may be repeated or reiterated in a number of ways, with the same image being analyzed repeatedly with the selection and analysis of different patches, and an identified patch can be tracked and analyzed for change over a number of sequential images.

Figure 10:
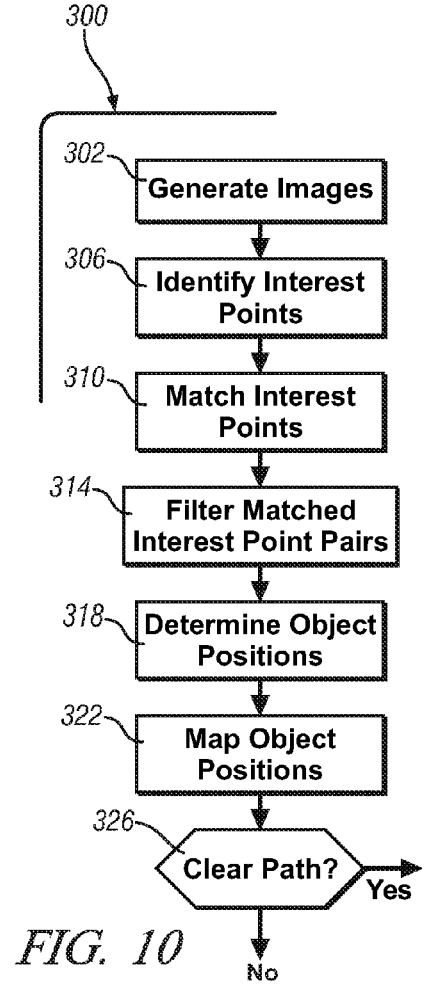
FIG. 10 is a flowchart for a texture-rich pixel-based method for detecting a clear path, in accordance with the disclosure.

FIG. 10 illustrates an exemplary texture-rich pixel-based method 300 wherein input from a camera is analyzed to determine a clear path likelihood in accordance with the disclosure. The texture-rich pixel-based method 300 is illustrated in FIG. 10, and described herein as comprising discrete elements. Such illustration is for ease of description and it should be recognized that the functions performed by these elements may be combined in one or more devices, e.g., implemented in software, hardware, and/or application-specific integrated circuitry. For example, the pixel-based method 300 may be executed as one or more algorithms in the processing module 120.

During operation, the camera 110 generates an image for analysis in the processing module 120 (302). The processing module 120 analyzes the image for interest points, for example, examining pixel color intensity as described hereinabove and comparing the pixel or a group of pixels with surrounding pixels. An interest point is an identifiable pixel on an image and is associated with a set of visual information, i.e., texture-rich features, and is associated with objects located in the field-of-view. Through methods known in the art, e.g., a scale-invariant feature transform (SIFT), methods employing corner detection or other shape detection, or a Sobel filter, interest points can be identified and utilized to accomplish methods described herein (306). In one embodiment, redundant interest points, e.g., multiple interest points corresponding to the same feature, are removed for computational efficiency considerations.

Once the interest points are identified, the processing module 120 compares sequential images when the vehicle is in motion to match interest points from each image to corresponding points in the sequential images which correspond to the same points in the field-of-view, where possible (310). Matching includes using correspondence matching programming, e.g., a scale-invariant feature transform (SIFT) feature matching programming and optical flow programming, and may further include locating corresponding points through template matching, taking into account movement of the host vehicle, and making a best estimate whether two points represent the same object or feature visible in the field-of-view. Template matching may be determined using one of multiple methods, including one of several known template matching programming methods to find the corresponding interest points, e.g., Lucas-Kanade or Horn-Schunck. The resulting matched point pairs correspond to a same feature located on both images wherein the same feature is associated with a same object in the field-of-view. While interest points can be matched, not all matched corresponding point pairs represent high quality corresponding point pairs that allow the identification of their three-dimensional positions in the field-of-view for classifications as a clear path for the vehicle to travel through.

The processing module 120 filters the matched corresponding point pairs in order to identify high quality corresponding point pairs that can be utilized for three-dimensional position identification with high confidence (314). Preferential matched point pairs may be selected based upon quality control criteria, e.g., distance between points, distance from image boundary, and color similarities between respective neighboring pixels. Selection of criteria to judge matched pairs can additionally be made based upon conditions such as light level present outside the vehicle, weather, speed of the vehicle, and any other factor affecting an ability to judge matched pairs or an urgency to quickly and accurately define a clear path.

The high quality corresponding point pairs are analyzed to determine three-dimensional positions of objects in the field-of-view represented by the corresponding point pairs (318). It will be appreciated that corresponding points at different heights as compared to ground level will move differently between sequential images. Analyzing movement of the interest points between sequential images can yield estimated three-dimensional coordinates of the interest points. Object position can be determined based upon the high quality corresponding point pairs, sample time between sequential images, and vehicular data such as vehicle speed, and vehicle yaw rate. These methods of triangulation can yield a position of the object in a horizontal plane and a height of the object in relation to a ground level.

The determined object positions are utilized to map object positions in front of the host vehicle including an estimated topography of the field-of-view (322). The topography may be estimated by assigning predetermined spatial dimensions around the object. Preferably, the predetermined spatial dimensions diminish with respect to height at a predetermined rate with respect to distance from the object. Using the map and estimated topography the processing module 120 can determine a clear path in front of the host vehicle (326).

The above method utilizes sequential images to establish a map of object positions and vertical heights in front of the vehicle, such that a clear path can be defined. It will be appreciated that in any two given images, a particular object might not be classified as including two high quality interest points sufficient to be mapped in that particular analysis. However, the above analysis occurs multiple times per second of vehicle travel. As the vehicle travels forward through the clear path, different perspectives upon an object will be gained and a large number of images will be analyzed. Travel over a path and analysis of the multiple iterative images through that path build a confidence through the analyses that no object contradicting the clear path exists in the identified clear path.

Figure 11:
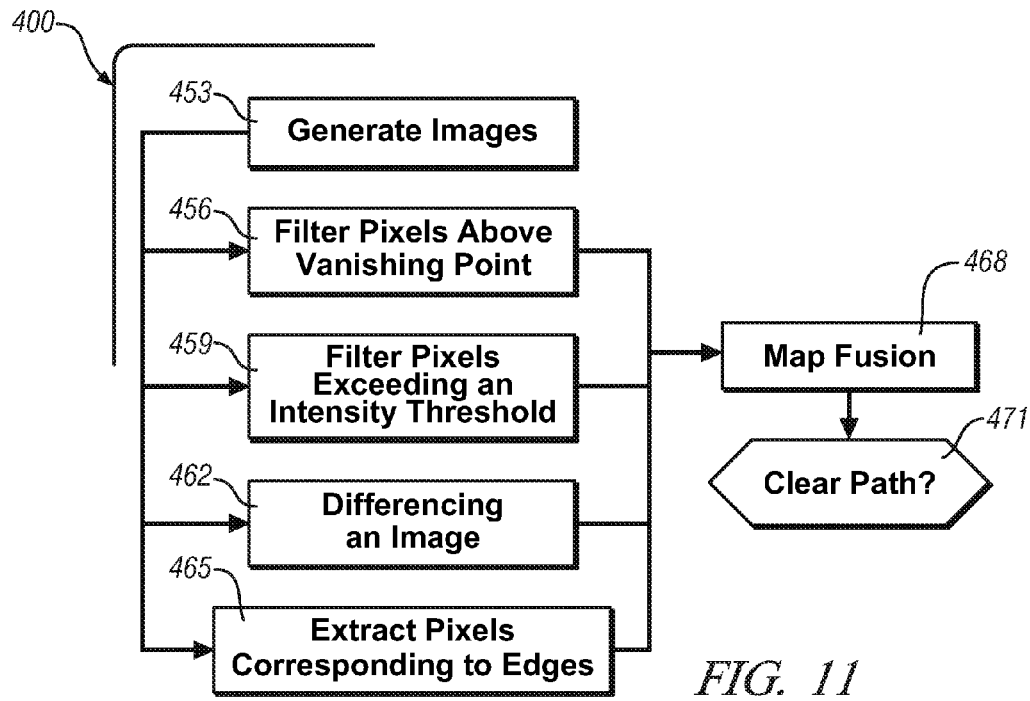
FIG. 11 is a flowchart for a textureless pixel-based method for detecting a clear path, in accordance with the disclosure.

FIG. 11 illustrates an exemplary textureless pixel-based method 400 wherein input from a camera is analyzed to determine a clear path likelihood in accordance with the disclosure. The textureless pixel-based method 400 is illustrated in FIG. 11, and described herein as comprising discrete elements. Such illustration is for ease of description and it should be recognized that the functions performed by these elements may be combined in one or more devices, e.g., implemented in software, hardware, and/or application-specific integrated circuitry. For example, the textureless pixel-based method 400 may be executed as one or more algorithms in the processing module 120.

During operation, the camera 110 generates an image for analysis in the processing module 120 (453). The processing module 120 analyzes the image using multiple filtering methods to identify and remove non-conforming pixels from the image. Remaining pixels indicate a potential clear path for the vehicle to travel. FIG. 11 shows the textureless pixel-based method 400 including four exemplary filtering methods to identify and remove non-conforming pixels from the image. A textureless method could be used with some portion of the four exemplary methods and/or can include unnamed but similar methods to process the image.

A first exemplary filtering method removes pixels above a horizon or vanishing point, including sky and other vertical features that cannot be part of a road surface (456). The term "vanishing point" as used herein is a broad term, and is to be given its ordinary and customary meaning to one ordinarily skilled in the art, and refers to an infinite far point on the horizon that is intersected by multiple parallel lines on the ground in the view. Identifying a road surface creating a clear path on which to drive is necessarily below the vanishing point or horizon line. Filtering images to only analyze an area below the horizon line helps to clarify the pixels being analyzed to identify a road surface from irrelevant pixels. As one skilled in the art appreciates, there are many known methods for determining a vanishing point and corresponding horizon line.

A second exemplary filtering method applies a filter based upon variance in pixel color intensity, based upon a premise that a road surface will include a large surface with a visual intensity common across the surface (459). Pixels are removed from the image when an associated pixel color intensity varies greater than a predetermined threshold. For pixels associated with multiple colors, a pixel color intensity of any particular color that varies greater than the predetermined threshold may be removed from the image. The predetermined threshold may be updated based upon historical color intensity of pixels identified as clear.

A third exemplary filtering method applies a filter based upon differencing sequential images, allowing analysis of changes between the images (462). Pixels associated with a pixel color intensity that changes greater than a predetermined threshold from the sequential images may be removed from the image. In one embodiment, the adjustments are made to the images based upon motion of the vehicle so that pixels are differenced and compared as if all pixels correspond to points at a ground level. Known triangulation methods may be used for determining motion adjustments to the images. By using an assumption that all objects in the image are at ground level, non ground level points may be identified by changes not consistent with pixels associated with the ground level. For example, pixels above ground level may move faster between sequential images than would be expected, and this movement may be identified by examining the difference between pixel color intensities between sequential images.

A fourth exemplary filtering method applies a filter based upon identifying pixels representing edges or transitions in the visual data (465). To create the fourth filtered image, the processing module 120 extracts pixels from the image based upon color intensity values that correspond to edges using one of several known edge detection filters, e.g., a Sobel filter. The edge detection filter is preferably executed in the processing module 120, but may be combined in one or more devices, e.g., implemented in software, hardware, and/or application-specific integrated circuitry. In one embodiment, each pixel is analyzed using a Sobel operator. The Sobel operator computes a gradient vector of color intensity at each pixel resulting in a direction of the largest possible increase from light to dark and the rate of change in that direction. Points corresponding to a rate of change exceeding a threshold and corresponding to gradient vectors at nearby pixels indicate edges and are included in the fourth filtered image. Those pixels are included in the image while the others are removed.

Applying the various methods in parallel, the results can be the fused into a single map of the image (468). Fusion includes pixels identified in each of the various filtering methods. Pixels on the fused clear path map correspond to desirable driving locations in the field-of-view. Locations on the fused clear path map without pixels correspond to undesirable driving locations in the field-of-view. The processing module 120 may analyze the map for visual data indicative of a clear path of travel (471).

The textureless pixel-based method 400, described in FIG. 11, applies various methods to images in parallel to identify features in a view relevant to defining a clear path. However, it will be appreciated that these methods need not be performed in parallel, but rather the methods can be used to process images sequentially in steps or selectively to identify features in a view relevant to defining a clear path.

An addition pixel-based clear path detection method includes applying a fused texture-rich and textureless method.

The texture-rich and textureless methods can be fused in a number of ways. An image with identified points and determined heights identified with texture-rich methods can be overlaid with a filtered image generated by textureless methods, and agreement of the two methods can be used to define a clear path through the overlaid image. In an alternative method to fuse the two schemes, the data from each of the two schemes can be used to project information upon a programmed overhead map of an area in front of the vehicle, and this overhead map including data gained from analysis of the two schemes can include building confidence indications for regions of the map. In an alternative method to fuse the two schemes, one scheme can be utilized as a primary or dominant scheme, and the second scheme can be utilized or activated to analyze regions in the view identified as ambiguous or unclear. In any method to fuse the two schemes, strengths of one processing scheme can be used to reduce weaknesses of the other processing scheme. If both schemes concur that the path is clear, then the processing module employing the schemes may determine with increased confidence that the path is desirable for the vehicle to traverse. A number of methods to fuse the identified schemes are envisioned, and the disclosure is not intended to be limited to the particular embodiments described herein. Additionally, either scheme or both schemes can be combined with the method employed above utilizing analysis of patches.

An example-based method can be utilized alternatively or additionally to define a clear path based upon an input image. An exemplary example-based method collects a number of sample images of views, defining a clear path for each of the sample images, matches a current image to one or more of the sample images, and determines a clear path based upon the matching. Matching the current image to one or more of the sample images can be accomplished, for example, by extracting features from each of the sample images, extracting features from the current image, comparing the extracted features from the current image to a database of extracted features from the sample images, and selecting matching sample images to the current image. A clear path can be selected from the best matching sample image or can be determined based upon a combination of the closest matches to the current image.

Hierarchical configurations of multiple clear path detection algorithms may be incorporated into this disclosure, including algorithms arranged based upon computational intensity. Less computationally intensive detection methods can identify clear paths in the image and leave remaining sections of the image not identified as a clear path for more computationally intensive analysis thereby increasing computational efficiency for clear path identification. The particular methods utilized and the hierarchical structure of the particular hierarchical method used can differ or change. In an exemplary hierarchical configuration, a patch-based clear path detection method identifies clear paths in the image before a pixel-based clear path detection method analyzes the remaining sections of the image not identified as a clear path by the patch-based method. In one embodiment, a second exemplary hierarchical layer utilizing an example-based method further analyzes sections not identified as a clear path by the pixel-based method. However, a number of different hierarchical configurations are envisioned, and the disclosure is not intended to be limited to the particular embodiments described herein.

The above described textureless method of image analysis filters from an image non-conforming regions of the image as not belonging to a planar, consistent road surface. This method, using the various filters applied in parallel to the image, removes from the image areas that cannot be a clear path, and what remains is a candidate for designation as a clear path. An alternative method, a segmentation-based clear path method, similarly analyzes with several analysis methods in parallel the image to identify a clear path. However, instead of filtering away portions of the image, the exemplary segmentation-based method seeks to first subdivide or segment the image according to discernable boundaries within the image and to second make judgments regarding the segments to identify a clear path.

A segmentation-based method uses analysis methods to subdivide an image. One exemplary configuration utilizes motion analysis, texture analysis, color analysis, and geometric analysis to segment the image.

Motion analysis can take many forms. As depicted in FIGS. 6A-6C, differencing between two images or a series of images can be utilized to distinguish movement of an object with respect to a background. In another example, feature recognition within the image can be utilized to evaluate a visible object to conform with a shape known to be prone to movement, such as another vehicle oriented in a particular relative direction to the vehicle, or a pedestrian. In another example, wherein another vehicle system in addition to the image can be utilized, such as a radar system, providing radar return data from the object, or vehicle to vehicle (V2V) communications, providing position and movement data from the communicating vehicle, tracking and movement of the object can be discerned and overlaid with the image to impose a subdivision upon the image. One example of this would include opposing traffic upon a two-way street. Sensing the movement of that traffic can be used to segment the opposing lane from a current lane. Other forms of motion analysis are known in the art. It will be appreciated that motion of the vehicle can be taken into account when judging motion of objects or features within the image.

Once motion analysis is performed, objects or regions of the image associated with the motion relative to a stationary ground plane can be segmented or subdivided from the rest of the image as a region of the image not likely to be a candidate for a clear path. Such exemplary operation segments a portion of the image as a stationary area potentially containing a clear path from the region with identified motion. Further, an implication of the detected motion can be utilized, for example, to segment a portion in front of the moving object as a potential collision zone and, therefore, not a clear path from other portions of the image that can represent a clear path. A number of methods to employ information discernable through motion analysis are envisioned, and the disclosure is not intended to be limited to the particular embodiments described herein.

Texture analysis is discussed in association with the texture rich and textureless methods described above. According to exemplary texture rich methods, pixel intensity contrasts, color contrasts, recognizable lines, corners and other features can all be recognized and analyzed in an image according to methods described above and according to other methods known in the art. According to exemplary textureless methods, different filters can be applied to the image based upon recognizable patterns in the image to identify areas in the image more likely to include a clear path.

Once texture analysis is performed, analysis of features apparent and/or textureless regions in the pixels of the image can provide definition of portions of the image useful to segment the image. Such exemplary operation segments a portion of the image based upon properties detected and potential impacts to potential clear paths. Presence of particular textures or pixelated features can be useful to analysis. For example, lane markers can be discerned and are useful to define different segments or sub-divisions of the image to represent the road surface and relevant to defining a clear path. Similarly, curbsides, road shoulders, and roadside barriers can be used to segment a portion of the image representing the road surface from other areas of the image. Similarly, as described above, lane geometry or other indications that can be determined through texture analysis can be useful to define a horizon or vanishing point. The horizon or vanishing point can be used to segment the ground upon which a clear path may exist from sky and other background above the horizon upon which a clear path may not exist. Additionally, objects discernable through texture rich analysis can be analyzed according to their height relative to the surface of the ground. Through this analysis, texture describing a median of the road, a snow bank, or a line of parked cars can be used to segment a region of the image upon which a clear path cannot exist from a region upon which a clear path can exist. In another example, a lack of texture or identification of a textureless region of the image, as a flat surface of a roadway can appear, can be useful to identify a segmented portion of the image as a potential clear path from other areas with discernable texture. A number of methods to employ information discernable through texture analysis are envisioned, and the disclosure is not intended to be limited to the particular embodiments described herein.

Color analysis can be employed, in methodology similar to the textureless methods described above, to segment a portion of the image that can represent a road surface upon which a clear path may exist from areas that cannot represent a road surface. Whereas the textureless method filters or eliminates portions of an image based upon color, color analysis segments portions of the image based upon color, specifically segmenting portions of the image with colors that can represent a road surface from portions of the image with colors that cannot represent a road surface.

Once color analysis is performed, regions of the image with colors that can represent a road surface can be distinguished from areas of the road that cannot represent a road surface. Color analysis can segment portions of the image by color, for example, segmenting a green area of the image from a gray area of the image. In this example, a road can be gray, whereas a road is unlikely to be green. Color analysis can similarly be used to define lane markers, construction zone markers, school zone markers, hatched designs upon the road indicating do not travel zones and other indications that can be judged according to color of markings upon or near the road. A number of methods to employ information discernable through color analysis are envisioned, and the disclosure is not intended to be limited to the particular embodiments described herein.

Segmentation of the image into a variety of subdivisions by the exemplary methods above and/or recognition of shapes evident within the image of allow recognition of geometric patterns significant within the image. Such geometric patterns can, once identified, be analyzed for significance to existence of a clear path.

Geometric shapes can be utilized to identify regions of the image likely to indicate a road surface capable of being a clear path. For instance, a parallelogram-based shape wider at the base and narrower at the top, with substantially parallel lines including the base of the image and a determined horizon line can be indicative of a current lane of travel upon a roadway. A similar parallelogram-based shape or a shape adjacent to a current lane of travel that could be a parallelogram if extended past an intervening vertical edge of the image or shapes with lines seemingly parallel to a current lane of travel can be indicative of a neighboring lane of travel and potentially a clear path depending upon other indications. Shapes contiguous with a current lane of travel or an identified neighboring lane of travel, not segmented from the respective lane of travel, can potentially be a connecting roadway and potential clear path. Further, shapes can be logically joined together to indicate a road surface or lane of travel. For example, a transition from a roadway to a bridge surface frequently includes a noticeable transition. Such a transition, identified through the methods described above, can create geometric shapes terminating at the transition. However, analysis of the geometric shapes can indicate that the two shapes together likely indicate a contiguous lane of travel.

Similarly, geometric shapes can be identified as not being indicative of a roadway or a lane of travel capable of being a clear path. Lanes of travel require that a vehicle can travel through the lane. Shapes ending abruptly, clearly separate from other identified lanes of travel, separated by a shape indicating an abrupt change in surface height or otherwise indicating obstruction to travel can be used to segment portions of an image from other areas that can be a clear path. Exemplary shapes indicating abrupt changes in height can include shapes exhibiting vertical lines consistent with walls or sharp curbs.

Additionally, a size of an identified geometric shape can be descriptive of whether the shape can represent a roadway or clear path. A lane of travel close to the vehicle must be at least a certain size in order to be a clear path through which the vehicle can travel. A geometric shape or a pattern of geometric shapes can be determined to support or not support a clear path due to the potential size of the road surface indicated by the shapes. As the analyzed surface is further away from the vehicle, a lane of travel supporting a clear path can appear smaller in the image due to perspective. A number of methods to employ information discernable through shape analysis are envisioned, and the disclosure is not intended to be limited to the particular embodiments described herein.

It will be appreciated that the methods described above are exemplary. Fewer analyses can be combined to describe the clear path, and the particular analyses selected can be selectably utilized based upon monitored factors affecting the accuracy or efficiency of each of the methods according to any selection method sufficient to evaluate the different analysis methods. Such factors can include weather, light level, traffic density, speed of the vehicle, and other factors.

Different methods can additionally be utilized. For example, simple thresholding methods are envisioned. One example utilizes histogram thresholding segmentation. Such an exemplary method finds histogram valley/valleys location(s) and uses the location(s) as threshold to partition the image. In another example, auto-thresholding segmentation or ostu-segmentation methods can be utilized. Instead of using a predefined fixed threshold, ostu-segmentation utilize methods sufficient to contemplate image recognition or partition methodology to determine optimal thresholds to segment the image. Such threshold(s) can be found using a method to find an optimal threshold based on inter-class and inner-class variances.

Another example utilizes region growth segmentation. Beginning from a seed and spreading over the whole image, when a neighbor pixel is investigated, the difference is calculated from a previously determined region mean. If the difference is less than a threshold, then the pixel is merged into the region. Otherwise, this pixel forms a new seed and starts another region.

Another example utilizes watershed methods to segment an image. In a method analogous to following water flow on a topographic map, start partitions are defined from the local lowest locations and the partitions are increased until the each partitioned area reaches the watershed ridges and stops there. These watershed ridges become the boundaries of the segmentation patches. Such a watershed method can work on original image or gradient image.

Another example includes clustering methods. For example, a K-mean method is known. In feature space, start from a randomly selected k or pre-defined center points. Clustering is then performed for all pixels. Through a series of iterations, a mean is updated (with a center in feature space) and a variance is updated, and clustering is again performed in next iteration. Repetition stops when inner class variance reaches a threshold or after a maximal number of iterations of inner class variance reaches a threshold and after clustering results do not change from one iteration to the next. In another example, an ISODATA segmentation method is known. ISODATA segmentation is an improvement over k-mean methods: instead of a fixed k partitions, ISODATA method introduces "split and merge" methods known in the art into the clustering process. When an inter-class distance is smaller than a threshold, then the classes are merged. When inner-class variance is larger than a threshold, then the class splits. The final partition can have various patch numbers.

Another example includes graph based segmentation. The method can be performed on grid-graph or image space or on a nearest-neighbor graph in feature space. When the method is performed in feature space, the result is similar to K-mean or ISODATA methods. When the method is performed on grid-graph, the method considers an image as a graph $G=(V, E)$, where each node $v\_i$ in V corresponds to a pixel, and E contains edges connecting pairs of "neighboring" (in image space or in feature space) pixels. The principle of this method is to compare the internal difference of a component and difference between two components, with the adjustment of a tolerance function. The method begins from the smallest components (for example, starting with each pixel) and merges components until the inter-component difference is larger than the intra-component difference. The tolerance function controls the desired segmentation size.

In another example, radar, LIDAR, global positioning data in combination with a digital map, vehicle to vehicle communication, vehicle to infrastructure communication, or other inputs describing an operating environment of the vehicle can be used to provide distinct analysis that can be overlaid upon and used to segment the input image. Other methods of image processing or analysis or other sources of information regarding the operating environment of the vehicle can be employed in addition or in the alternative to those given as examples herein to segment portions of an image that can support a clear path from other portions that cannot, and the disclosure is not intended to be limited to the exemplary embodiments described herein.

Additional methods are herein disclosed for detecting a clear path of travel for the vehicle 100 including methods to detect objects around the vehicle and place those objects into a context of a clear path determination. Detection of the object or objects and any contextual information that can be determined can be utilized to enhance the clear path of travel with an impact of object to the clear path. Information regarding an operational environment of the vehicle, including detection of objects around the vehicle, can be used to define or enhance a clear path. For example, the clear path detection analysis may be augmented using vehicle detection analysis and construction area detection analysis. A detected object such as another vehicle or a construction barrier may inhibit safe vehicle travel and/or indicate conditions or constrains limiting vehicle travel. The vehicle detection analysis detects vehicles in a field-of-view. The construction area detection analysis detects construction areas and other zones associated with limiting vehicle travel. The separate methods for analyzing a roadway are used to strengthen confidence in clear paths identified in the field-of-view. Similarly, clear path detection analysis can be used to augment the vehicle detection analysis and the construction area detection analysis.

Vehicle detection analysis includes analyzing the environment around the vehicle to detect other vehicles using one or multiple detection systems. The detection systems can include but are not limited to camera-based systems, radar-based systems, LIDAR-based systems, and ultrasonic sensor-based systems. It will be further appreciated that detection or relative location information can be remotely communicated through V2V communications or vehicle to infrastructure (V2I) communications. Vehicle detection can include vehicle tracks to determine vehicles as objects to be avoided. Additionally, vehicle tracks can be used to describe exemplary clear paths and compare to other available information. Additionally, vehicle position with respect to the vehicle, for example, as described with respect to a longitudinal axis of the host vehicle, can describe potential behavior of the clear path based upon a single image. For example, a vehicle at some distance from the host vehicle, traveling away from the host vehicle, and located 5 degrees to the left of the axis of the host vehicle, can be used to estimate curvature to the left in the upcoming roadway in anticipation of defining the clear path.

Figure 12:
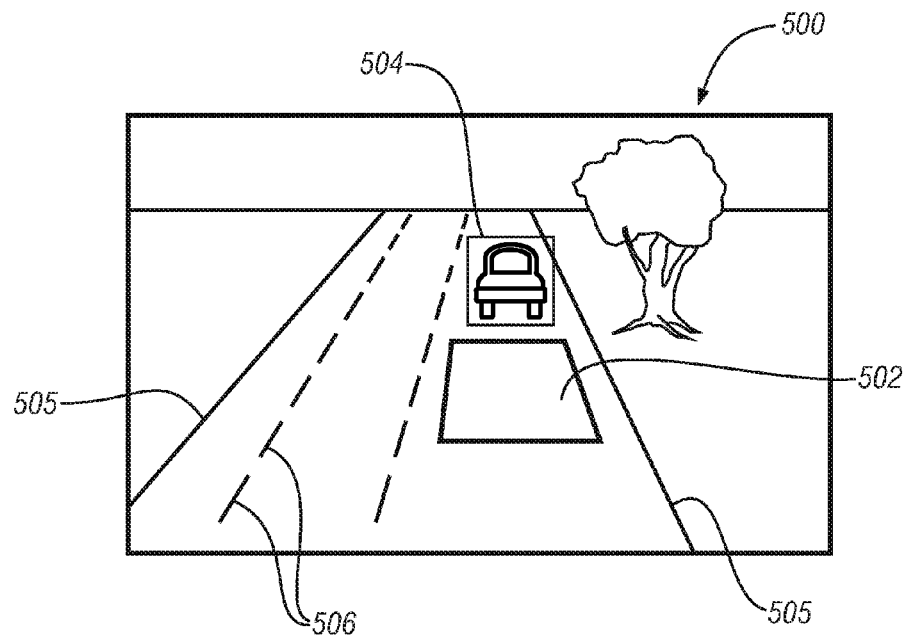
FIG. 12 shows an exemplary image used to illustrate a vehicle detection analysis, in accordance with the disclosure.

Methods are herein disclosed for detecting vehicles in an image using a camera-based vehicle detection system, described with reference to FIG. 12. FIG. 12 shows an exemplary image 500. The camera-based vehicle detection system analyzes the image 500 in a number of ways to identify image coordinates corresponding to a vehicle. Texture-rich methods may be used wherein corresponding matched interest points of sequential images are analyzed using triangulation methods to determine motion of objects associated with the corresponding matched interest points. The motion may be evaluated for identifiable behavioral characteristics to determine whether the object corresponds to a vehicle. The identifiable behavioral characteristics correspond to behaviors attributable to a vehicle, and may be assigned a confidence likelihood value, wherein an object corresponding to a confidence likelihood exceeding a threshold is defined as a vehicle. The identifiable behavioral characteristics may be evaluated in context of image location and speed of the vehicle 100. For example, objects corresponding to a region immediately in front of the vehicle will likely have a speed similar to the vehicle 100 as compared with subsequently monitored images. Additional detected stationary or transient objects may aid the evaluation including detected lane boundaries 505 and/or lane markers 506. Objects that correspond to a vehicle are more likely to travel within the lane marker and avoid crossing lane boundaries. Objects exhibiting identifiable behaviors increase a confidence likelihood that the objects correspond to a vehicle or vehicles.

Objects exhibiting motion and identified using texture-rich methods may be used in conjunction with template matching programming. Template matching includes comparing predetermined templates with an image area 504 selected in the image. Image areas within the image include a plurality of spatially related pixels selected for analysis and identifiable by image coordinates. Template matching can be executed using one of multiple methods, including on gray-scale images and light normalized images. A plurality of vehicle templates is constructed to correspond to multiple views of a vehicle, including templates associated with longitudinal vehicle travel and templates associated with substantially perpendicular crossing vehicle travel. The templates are compared with the image area corresponding to the feature exhibiting motion. In one embodiment, template matching may include comparing image intensities of pixels with the template using a sum of absolute differences measurement. Linear spatial filtering may be executed on the image area to determine an image area with a highest correspondence with the template. Image areas associated with a predetermined threshold correspondence are considered to match the template.

Detecting objects around a vehicle frequently include vehicle tracking. An exemplary method to accomplish vehicle tracking is disclosed. A radar-based vehicle detection system uses the radar imaging system 130 to estimate vehicle dimensions and motion of vehicles in front of the vehicle 100. Returns can be analyzed and vehicle locations with respect to the vehicle 100 can be estimated according to methods known in the art.

Figure 15:
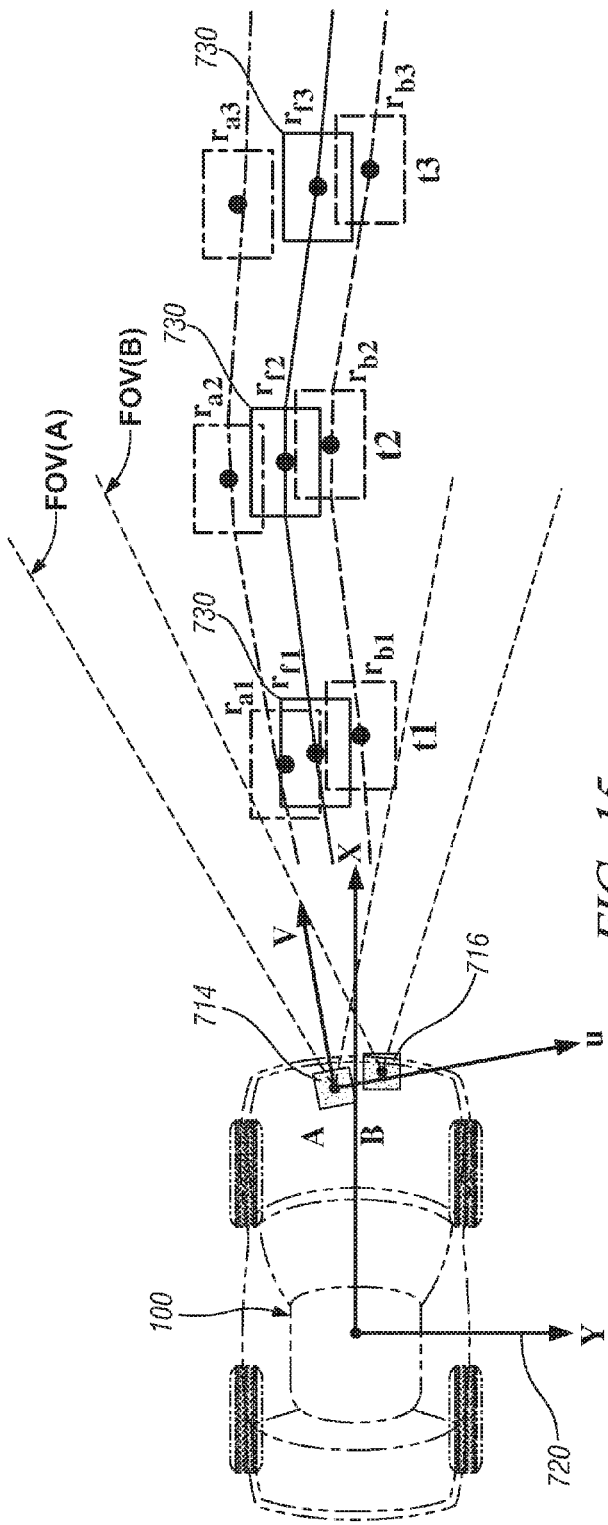
FIG. 15 shows a schematic diagram of an exemplary vehicle system which has been constructed with the target tracking system, in accordance with the present disclosure.
Figure 16:
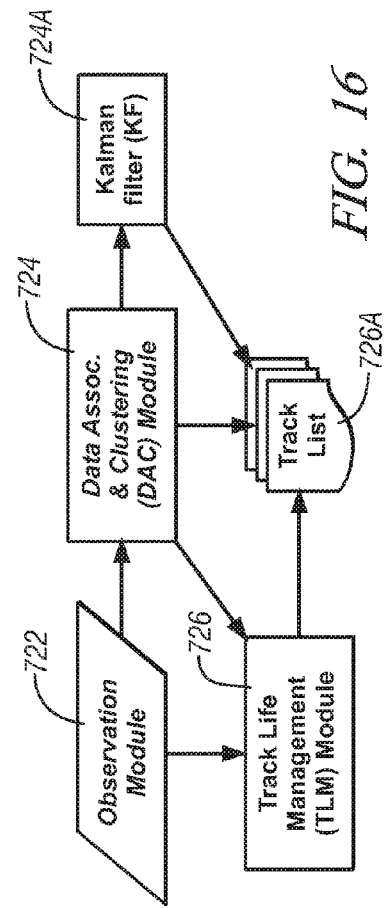
FIG. 16 shows a control system for information flow utilized in creating a track list, in accordance with the present disclosure.
Figure 17:
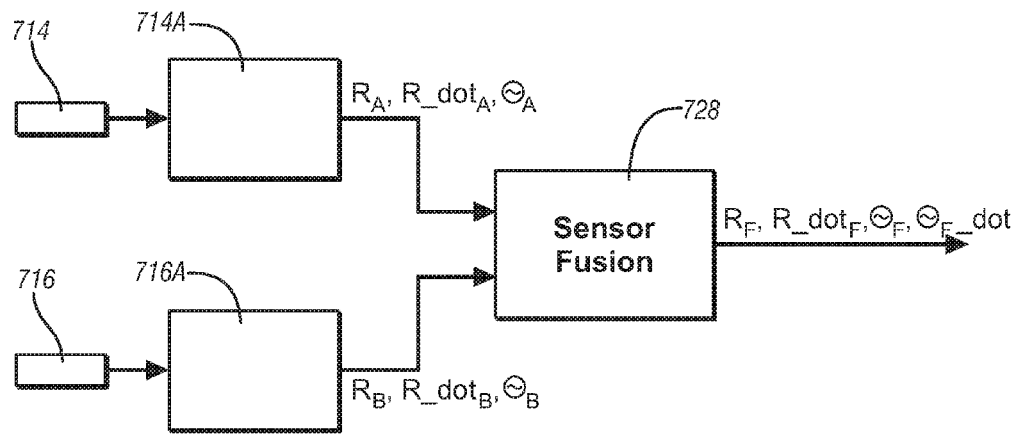
FIG. 17 depicts an exemplary data fusion process, in accordance with the present disclosure.

Referring to FIGS. 15-17, the vehicle 100 includes radar imaging system 130 including a target tracking system including sensing devices 714 and 716 to estimate vehicle dimensions and motion of vehicles in front of the vehicle 100. FIG. 15 shows a schematic diagram of the vehicle 100 system which has been constructed with the target tracking system, in accordance with the present disclosure. The exemplary target tracking system preferably includes object-locating sensors comprising at least two forward-looking range sensing devices 714 and 716. The object-locating sensors may include a short-range radar subsystem, a long-range radar subsystem, and a forward vision subsystem. The object-locating sensing devices may include any range sensors, such as FM-CW radars, (Frequency Modulated Continuous Wave), pulse and FSK (Frequency Shift Keying) radars, and LIDAR (Light Detection and Ranging) devices, and ultrasonic devices which rely upon effects such as Doppler-effect measurements to locate forward objects.

These sensors are preferably positioned within the vehicle 100 in relatively unobstructed positions relative to a view in front of the vehicle. It is also appreciated that each of these sensors provides an estimate of actual location or condition of a targeted object, wherein the estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but is not normally robust in estimating the extent of a detected object. A camera with vision processor is more robust in estimating a shape and azimuth position of the object, but is less efficient at estimating the range and range rate of the object. Scanning type LIDARs perform efficiently and accurately with respect to estimating range, and azimuth position, but typically cannot estimate range rate, and is therefore not accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, conventional sensors present parametric variances, but more importantly, the operative overlap of these sensors creates opportunities for sensory fusion.

Each object-locating sensor and subsystem provides an output including range, R, time-based change in range, R_dot, and angle, Θ, preferably with respect to a longitudinal axis of the vehicle, which can be written as a measurement vector (o), i.e., sensor data. An exemplary short-range radar subsystem has a field-of-view (FOV) of 160 degrees and a maximum range of thirty meters. An exemplary long-range radar subsystem has a field-of-view of 17 degrees and a maximum range of 220 meters. An exemplary forward vision subsystem has a field-of-view of 45 degrees and a maximum range of fifty (50) meters. For each subsystem the field-of-view is preferably oriented around the longitudinal axis of the vehicle 100. The vehicle 100 is preferably oriented to a coordinate system, referred to as an XY-coordinate system 720, wherein the longitudinal axis of the vehicle 100 establishes the X-axis, with a locus at a point convenient to the vehicle and to signal processing, and the Y-axis is established by an axis orthogonal to the longitudinal axis of the vehicle 100 and in a horizontal plane, which is thus parallel to ground surface.

FIG. 16 shows a control system for information flow utilized in creating a track list, in accordance with the present disclosure. The control system includes an observation module 722, a data association and clustering (DAC) module 724 that further includes a Kalman filter 724A, and a track life management (TLM) module 726 that keeps track of a track list 726A comprising of a plurality of object tracks. More particularly, the observation module 722 operates sensors 714 and 716, their respective sensor processors, and the interconnection between the sensors, sensor processors, and the DAC module 724.

FIG. 17 depicts an exemplary data fusion process, in accordance with the present disclosure. As shown in FIG. 17, the illustrated observation module includes first sensor 714 located and oriented at a discrete point A on the vehicle, first signal processor 714A, second sensor 716 located and oriented at a discrete point B on the vehicle, and second signal processor 716A. The first processor 714A converts signals (denoted as measurement $o_A$) received from the first sensor 714 to determine range (RA), a time-rate of change of range (R_dotA), and azimuth angle (ΘA) estimated for each measurement in time of target object 730. Similarly, the second processor 716A converts signals (denoted as measurement $o_B$) received from the second sensor 716 to determine a second set of range (RB), range rate (R_dotB), and azimuth angle (ΘB) estimates for the object 730.

The exemplary DAC module 724 includes a controller 728, wherein an algorithm and associated calibration is stored and configured to receive the estimate data from each of the sensors 714 and 716 to cluster data into like observation tracks (i.e. time-coincident observations of the object 730 by sensors 714 and 716 over a series of discrete time events), and to fuse the clustered observations to determine a true track status. It is understood that fusing data using different sensing systems and technologies yields robust results. Again, it is appreciated that any number of sensors can be used in this technique. However, it is also appreciated that an increased number of sensors results in increased algorithm complexity, and the requirement of more computing power to produce results within the same time frame. The controller 728 is housed within the host vehicle 100, but may also be located at a remote location. In this regard, the controller 728 is electrically coupled to the sensor processors 714A, 716A, but may also be wirelessly coupled through RF, LAN, infrared or other conventional wireless technology. The TLM module 726 is configured to receive and store fused observations in a list of tracks 726A.

Sensor registration, or "alignment" of sensors, in multi-target tracking ('MTT') fusion, involves determining the location, orientation and system bias of sensors along with target state variables. In a general MTT system with sensor registration, a target track is generated during vehicle operation. A track represents a physical object and comprises a number of system state variables, including, e.g., position and velocity. Measurements from each individual sensor are usually associated with a certain target track. A number of sensor registration techniques are known in the art and will not be discussed in detail herein.

The schematic illustration of FIG. 15 includes the aforementioned object-locating sensors 714 and 716 mounted on the exemplary vehicle at positions A and B, preferably mounted at the front of the vehicle 100. The target object 730 moves away from the vehicle, wherein t1, t2, and t3 denote three consecutive time frames. Lines ra1-ra2-ra3, rf1-rf2-rf3, and rb1-rb2-rb3 represent, respectively, the locations of the target measured by first sensor 714, fusion processor, and second sensor 716 at times t1, t2, and t3, measured in terms of $o_A=(R_A, R\_dot_A, \Theta_A)$ and $o_B=(R_B, R\_dot_B, \Theta_B)$, using sensors 714 and 716, located at points A, B.

A known exemplary trajectory fusing process permits determining position of a device in the XY-coordinate system relative to the vehicle. The fusion process comprises measuring the target object 730 in terms of $o_A=(R_A, R\_dot_A, \Theta_A)$ and $o_B=(R_B, R\_dot, \Theta_B)$, using sensors 714 and 716, located at points A, B. A fused location for the target object 730 is determined, represented as x=(RF, R_dotF, ΘF, ΘF_dot), described in terms of range, R, and angle, Θ, as previously described. The position of forward object 730 is then converted to parametric coordinates relative to the vehicle's XY-coordinate system. The control system preferably uses fused track trajectories (Line rf1, rf2, rf3), comprising a plurality of fused objects, as a benchmark, i.e., ground truth, to estimate true sensor positions for sensors 714 and 716. As shown in FIG. 15, the fused track's trajectory is given by the target object 730 at time series t1, t2, and t3. Using a large number of associated object correspondences, such as {(ra1, rf1, rb1), (ra2, rf2, rb2), (ra3, rf3, rb3)} true positions of sensors 714 and 716 at points A and B, respectively, can be computed to minimize residues, preferably employing a known least-squares calculation method. In FIG. 15, the items designated as ra1, ra2, and ra3 denote an object map measured by the first sensor 714. The items designated as rb1, rb2, and rb3 denote an object map observed by the second sensor 716.

In FIG. 16, referenced tracks are preferably calculated and determined in the sensor fusion block 728 of FIG. 17, described above. The process of sensor registration comprises determining relative locations of the sensors 714 and 716 and the relationship between their coordinate systems and the frame of the vehicle, identified by the XY-coordinate system. Registration for single object sensor 716 is now described. All object sensors are preferably handled similarly.

For object map compensation, the sensor coordinate system or frame, i.e. the UV-coordinate system, and the vehicle coordinate frame, i.e. the XY-coordinate system, are preferably used. The sensor coordinate system (u, v) is preferably defined by: (1) an origin at the center of the sensor; (2) the v-axis along longitudinal direction (bore-sight); and (3) a u-axis normal to v-axis and points to the right. The vehicle coordinate system, as previously described, is denoted as (x, y) wherein x-axis denotes a vehicle longitudinal axis and y-axis denotes the vehicle lateral axis.

The locations of track (x) can be expressed in XY-coordinate system as (r). Sensor measurement (o) can be expressed in UV-coordinate as (q). The sensor registration parameters (a) comprise of rotation (R) and translation (r0) of the UV-coordinate system.

Figure 18:
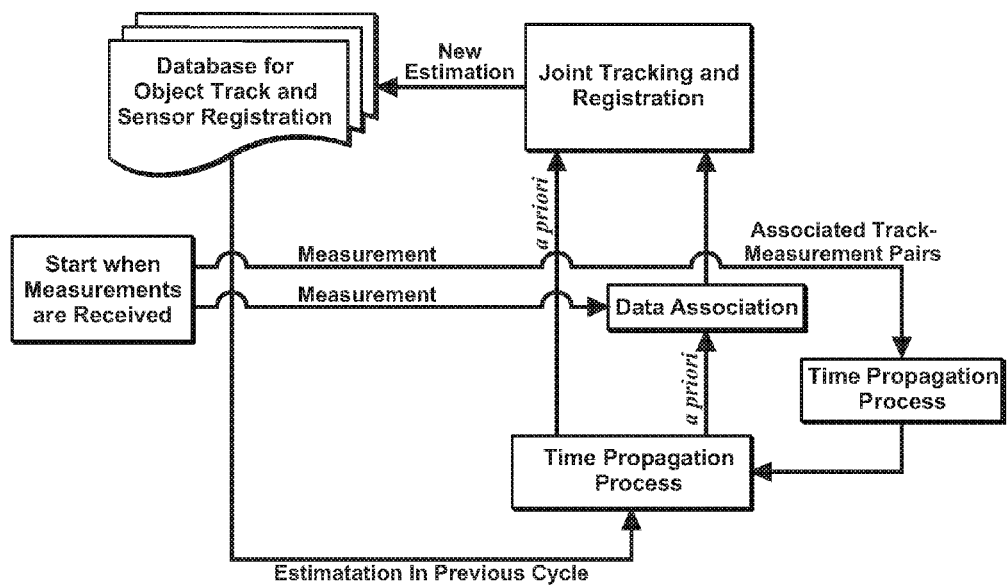
FIG. 18 depicts an exemplary dataflow enabling joint tracking and sensor registration, in accordance with the present disclosure.

FIG. 18 depicts an exemplary dataflow enabling joint tracking and sensor registration, in accordance with the present disclosure. The method is initiated upon reception of sensor data. A data association module will match the sensor data with the predicted location of a target. The joint tracking and registration module combines the previous estimation (i.e., a priori) and new data (i.e., matched measurement-track pairs), and updates the target tracks estimation and sensor registration data in the database. The time propagation process module predicts the target tracks or sensor registration parameters in the next time cycle based on the historical sensor registration, tracks and current vehicle kinematics via a dynamics model. The sensor registration parameters are usually assumed to be substantially constant over time. Confidence of the registration parameters accumulates over time. However, a priori information about registration will be reset to zero when a significant sensor registration change is detected (e.g., vehicle collision).

Object tracks can be utilized for a variety of purposes including adaptive cruise control, wherein the vehicle adjusts speed to maintain a minimum distance from vehicles in the current path, as described above. Another similar system wherein object tracks can be utilized is a collision preparation system (CPS), wherein identified object tracks are analyzed in order to identify a likely impending or imminent collision based upon the track motion relative to the vehicle. A CPS warns the driver of an impending collision and reduces collision severity by automatic braking if a collision is considered to be unavoidable. A method is disclosed for utilizing a multi-object fusion module with a CPS, providing counter-measures, such as seat belt tightening, throttle idling, automatic braking, air bag preparation, adjustment to head restraints, horn and headlight activation, adjustment to pedals or the steering column, adjustments based upon an estimated relative speed of impact, adjustments to suspension control, and adjustments to stability control systems, when a collision is determined to be imminent.

Figure 19:
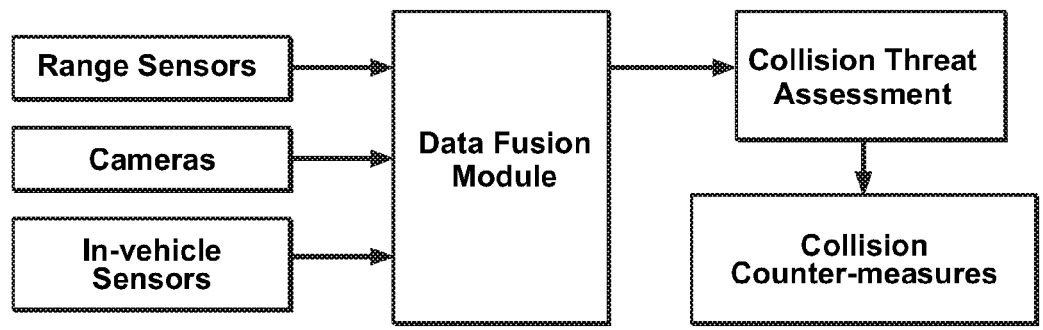
FIG. 19 schematically illustrates an exemplary system whereby sensor inputs are fused into object tracks useful in a collision preparation system, in accordance with the present disclosure.

FIG. 19 schematically illustrates an exemplary system whereby sensor inputs are fused into object tracks useful in a collision preparation system, in accordance with the present disclosure. Inputs related to objects in an environment around the vehicle are monitored by a data fusion module. The data fusion module analyzes, filters, or prioritizes the inputs relative to the reliability of the various inputs, and the prioritized or weighted inputs are summed to create track estimates for objects in front of the vehicle. These object tracks are then input to the collision threat assessment module, wherein each track is assessed for a likelihood for collision. This likelihood for collision can be evaluated, for example, against a threshold likelihood for collision, and if a collision is determined to be likely, collision counter-measures can be initiated.

As shown in FIG. 19, a CPS continuously monitors the surrounding environment using its range sensors (e.g., radar, LIDAR, ultrasonic sensors) and cameras and takes appropriate counter-measurements in order to avoid incidents or situations to develop into a collision. A collision threat assessment generates output for the system actuator to respond.

As described in FIG. 19, a fusion module is useful to integrate input from various sensing devices and generate a fused track of an object in front of the vehicle. The fused track created in FIG. 19 comprises a data estimate of relative location and trajectory of an object relative to the vehicle. This data estimate, based upon radar and other range finding sensor inputs is useful, but includes the inaccuracies and imprecision of the sensor devices utilized to create the track. As described above, different sensor inputs can be utilized in unison to improve accuracy of the estimates involved in the generated track. In particular, an application with invasive consequences such as automatic braking and potential airbag deployment require high accuracy in predicting an imminent collision, as false positives can have a high impact of vehicle drivability, and missed indications can result in inoperative safety systems.

Vision systems provide an alternate source of sensor input for use in vehicle control systems. Methods for analyzing visual information are known in the art to include pattern recognition, corner detection, vertical edge detection, vertical object recognition, and other methods. However, it will be appreciated that high-resolution visual representations of the field in front a vehicle refreshing at a high rate necessary to appreciate motion in real-time include a very large amount of information to be analyzed. Real-time analysis of visual information can be prohibitive. A method is disclosed to fuse input from a vision system with a fused track created by methods such as the exemplary track fusion method described above to focus vision analysis upon a portion of the visual information most likely to pose a collision threat and utilized the focused analysis to alert to a likely imminent collision event.

Figure 20:
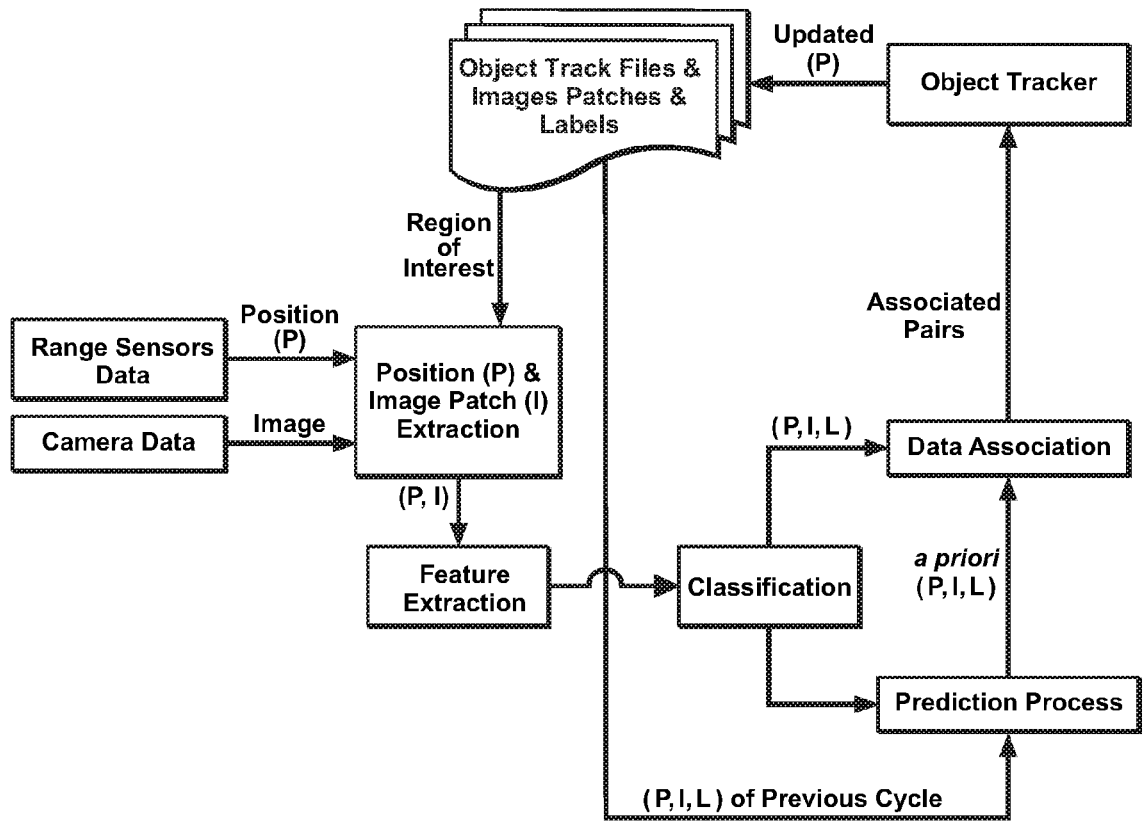
FIG. 20 schematically illustrates an exemplary image fusion module, in accordance with the present disclosure.

FIG. 20 schematically illustrates an exemplary image fusion module, in accordance with the present disclosure. The fusion module of FIG. 20 monitors as inputs range sensor data comprising object tracks and camera data. The object track information is used to extract an image patch or a defined area of interest in the visual data corresponding to object track information. Next, areas in the image patch are analyzed and features or patterns in the data indicative of an object in the patch are extracted. The extracted features are then classified according to any number of classifiers. An exemplary classification can include classification as a fast moving object, such a vehicle in motion, a slow moving object, such as a pedestrian, and a stationary object, such as a street sign. Data including the classification is then analyzed according to data association in order to form a vision fused based track. These tracks and associated data regarding the patch are then stored for iterative comparison to new data and for prediction of relative motion to the vehicle suggesting a likely or imminent collision event. Additionally, a region or regions of interest, reflecting previously selected image patches, can be forwarded to the module performing image patch extraction, in order to provide continuity in the analysis of iterative vision data. In this way, range data or range track information is overlaid onto the image plane to improve collision event prediction or likelihood analysis.

Figure 22:
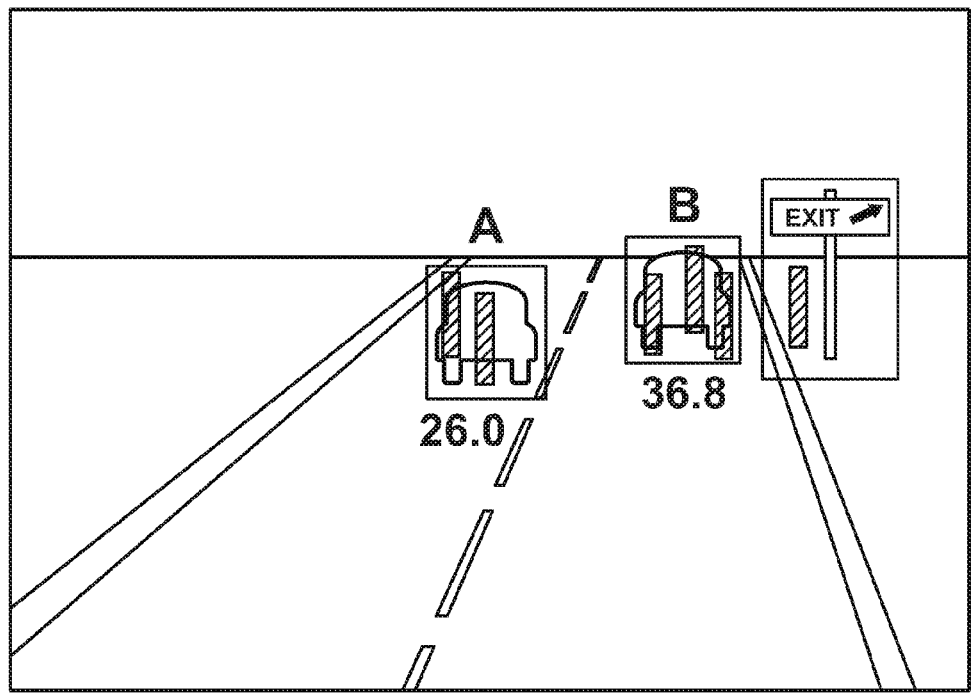
FIG. 22 illustrates exemplary range data overlaid onto a corresponding image plane, useful in system-internal analyses of various target objects, in accordance with the present disclosure.

FIG. 22 illustrates exemplary range data overlaid onto a corresponding image plane, useful in system-internal analyses of various target objects, in accordance with the present disclosure. The shaded bars are the radar tracks overlaid in the image of a forward-looking camera. The position and image extraction module extracts the image patches enclosing the range sensor tracks. The feature extraction module computes the features of the image patches using following transforms: edge, histogram of gradient orientation (HOG), scale-invariant feature transform (SIFT), Harris corner detectors, or the patches projected onto a linear subspace. The classification module takes the extracted features as input and feeds to a classifier to determine whether an image patch encloses an object. The classification determines the label of each image patch. For example, in FIG. 22, the boxes A and B are identified as vehicles while the unlabelled box is identified as a road-side object. The prediction process module utilizes an object's historical information (i.e., position, image patch, and label of previous cycle) and predicts the current values. The data association links the current measurements with the predicted objects, or determines the source of a measurement (i.e., position, image patch, and label) is from a specific object. In the end, the object tracker is activated to generate updated position and save back to the object track files.

Figure 21:
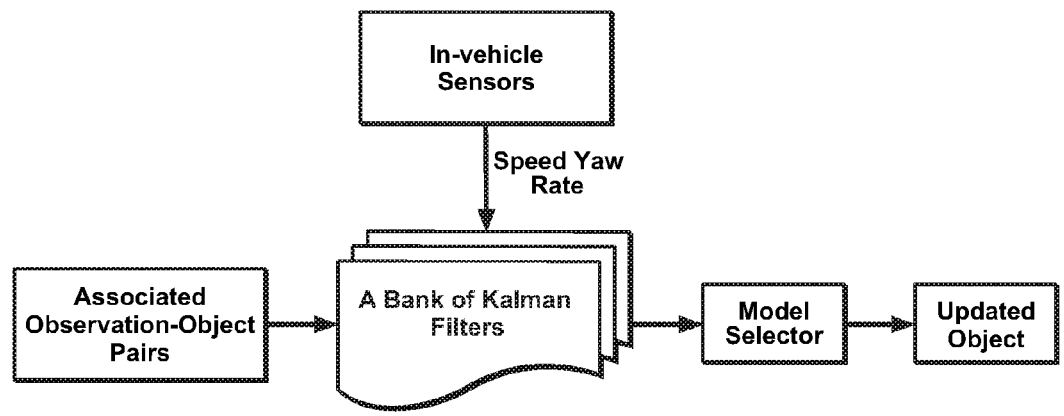
FIG. 21 schematically depicts an exemplary bank of Kalman filters operating to estimate position and velocity of a group objects, accordance with the present disclosure.

FIG. 21 schematically depicts an exemplary bank of Kalman filters operating to estimate position and velocity of a group objects, accordance with the present disclosure. Different filters are used for different constant coasting targets, high longitudinal maneuver targets, and stationary targets. A Markov decision process (MDP) model is used to select the filter with the most likelihood measurement based on the observation and target's previous speed profile. This Multimodel filtering scheme reduces the tracking latency, which is important for CPS function.

Reaction to likely collision events can be scaled based upon increased likelihood. For example, gentle automatic braking can be used in the event of a low threshold likelihood being determined, and more drastic measures can be taken in response to a high threshold likelihood being determined.

Additionally, it will be noted that improved accuracy of judging likelihood can be achieved through iterative training of the alert models. For example, if an alert is issued, a review option can be given to the driver, through a voice prompt, and on-screen inquiry, or any other input method, requesting that the driver confirm whether the imminent collision alert was appropriate. A number of methods are known in the art to adapt to correct alerts, false alerts, or missed alerts. For example, machine learning algorithms are known in the art and can be used to adaptively utilize programming, assigning weights and emphasis to alternative calculations depending upon the nature of feedback. Additionally, fuzzy logic can be utilized to condition inputs to a system according to scalable factors based upon feedback. In this way, accuracy of the system can be improved over time and based upon the particular driving habits of an operator.

It will be appreciated that similar methods employed by the CPS can be used in a collision avoidance system. Frequently such systems include warnings to the operator, automatic brake activation, automatic lateral vehicle control, changes to a suspension control system, or other actions meant to assist the vehicle in avoiding a perceived potential collision.

Additionally, numerous methods are known to achieve lane keeping or place a vehicle within a lane by sensor inputs. For example, a method can analyze visual information including paint lines on a road surface, and utilize those markings to place the vehicle within a lane. Some methods utilize tracks of other vehicles to synthesize or assist in establishing lane geometry in relation to the vehicle. GPS devices, utilized in conjunction with 3D map databases, make possible estimating a location of a vehicle according to global GPS coordinates and overlaying that position with known road geometries.

An exemplary method for generating estimates of geometry of a lane of travel for a vehicle on a road is disclosed. The method includes monitoring data from a global positioning device, monitoring map waypoint data describing a projected route of travel based upon a starting point and a destination, monitoring camera data from a vision subsystem, monitoring vehicle kinematics data including: a vehicle speed, and a vehicle yaw rate, determining a lane geometry in an area of the vehicle based upon the map waypoint data and a map database, determining a vehicle position in relation to the lane geometry based upon the lane geometry, the data from the global positioning device, and the camera data, determining a road curvature at the vehicle position based upon the vehicle position, the camera data, and the vehicle kinematics data, determining the vehicle orientation and vehicle lateral offset from a center of the lane of travel based upon the road curvature, the camera data and the vehicle kinematics, and utilizing the vehicle position, the road curvature, the vehicle orientation, and the vehicle lateral offset in a control scheme of the vehicle.

A LIDAR-based vehicle detection system can additionally or alternatively be utilized, transmitting and receiving optical energy to estimate vehicle dimensions and motion of vehicles in front of the vehicle 100. Similar to the radar-based vehicle detection system described hereinabove, patterns in the light waves reflecting off these vehicles can be analyzed and vehicle locations with respect to the vehicle 100 can be estimated.

Vehicle detection analysis is preferably augmented using lane geometry detection analysis to identify lane markers and/or road edges in a field-of-view. The lane markers 506 may be used to define vehicle lane boundaries and suggest image coordinates corresponding to greater likelihood for correspondence detected vehicles on a roadway. The lane markers 506 may be used to predict vehicle travel on the roadway, thereby assisting the clear path detection analysis. The lane marker detection analysis may be repeated or reiterated in a number of ways, with the same image area being analyzed repeatedly with the selection and analysis of different image areas, and an identified feature tracked and analyzed for change over a number of sequential images.

Lane markers may be detected using one of multiple methods. Camera-based detection includes convolving image data using a plurality of line orientation filters to generate a filter response that identifies an orientation of each segment of a lane marker. In one embodiment, a Hough transform technique is applied to identify line segments of lane markers using points on the lane markers. The Hough transform technique evaluates the line segments to determine a confidence that the line segment corresponds to a lane marker. Line segments corresponding to a confidence greater than a threshold are defined as a lane marker. The lane marker may be error tested based upon correspondence to identified objects in the field-of-view including the ground 20, and error tested for association with previously identified lane markers.

Another method to detect lane markers or road edges includes use of a LIDAR device. LIDAR utilizes an emission of light to generate sensor readings based upon the return signal of the light. It will be appreciated that LIDAR can be used to detect ranges to detected objects and in certain configurations can return three dimensional readings describing the environment surrounding the vehicle. It will additionally be appreciated that LIDAR can be utilized to analyze an intensity of the return light to describe the environment surrounding the vehicle. Sensor readings from a LIDAR system can be utilized to define a road edge according to a texture of three dimensional readings describing grass and other characteristics of an edge to the road. Also sensor readings from a LIDAR system can be utilized to define lane markers, for example, as described by intensity differences evident between a road surface and reflective paint used for lane markers.

Construction area detection analysis includes detecting construction areas and other zones associated with limiting vehicle travel. Travel may be limited in construction zones by construction objects, e.g., construction barrels, barriers, fencing and grids, mobile units, scattered debris, and workers. Travel may additionally be limited in construction zones by traveling constraints, e.g., speed zones and merger requirements. Detection of a construction area may be useful for changing vehicle control and operation in a number of ways. Upon detection of a construction area, vehicle programming may initiate or end certain autonomous or semi-autonomous vehicle controls. Vehicle operation can be limited to posted vehicle speeds and travel limited to certain areas or lanes. Detection of a construction zone may also initiate certain programming algorithms or detection schemes including, for example, a construction worker detection algorithm useful in areas where construction worker presence necessitates a speed decrease for the vehicle 100.

Methods are herein disclosed for detecting construction area in an image, described with reference to FIG. 13. Construction area detection analysis can utilize object detection methods, similar to those described above for vehicle detection, including methods utilizing one or more of a camera-based system, a radar-based system, and a LIDAR-based system. Construction area detection analysis can include analyzing an operational environment of the vehicle for correspondence to predetermined templates. The templates are associated with construction objects in the field-of-view indicating the vehicle 100 is located in a construction area.

Figure 13:
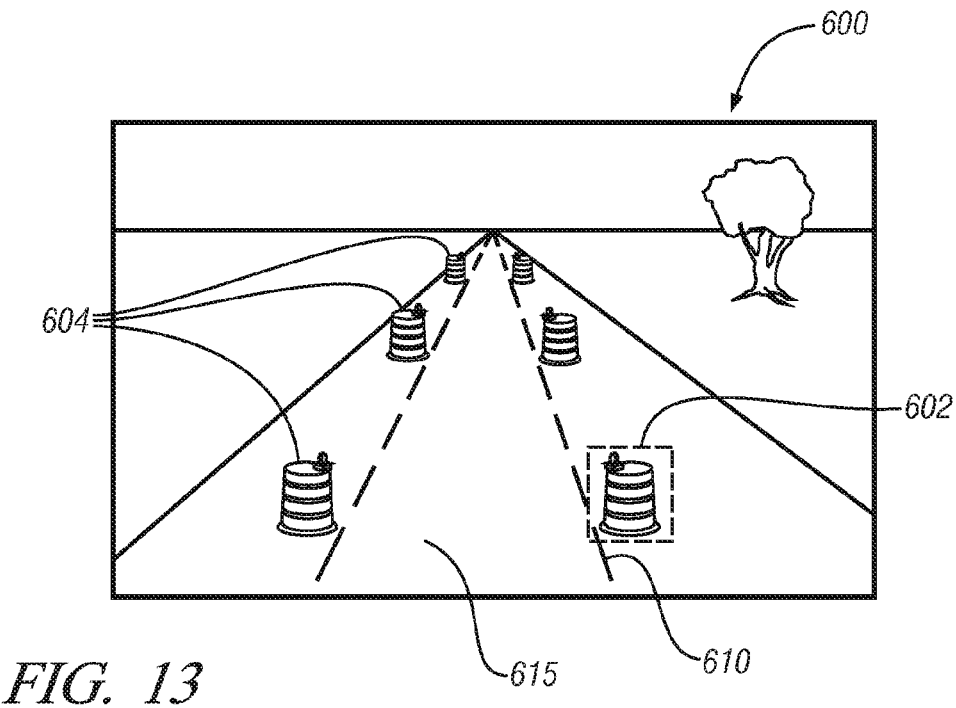
FIG. 13 shows an exemplary image used to illustrate a construction area detection analysis, in accordance with the disclosure.

FIG. 13 shows exemplary construction objects corresponding to construction barrels 604. The predetermined templates can include, for example, construction barrels, construction cones, road-side concrete grooves, mobile unit warnings, lane shift instructions, lane changing prohibitions, and other similar construction area signs. Pattern recognition programming including character or pattern recognition and traffic sign recognition can be utilized to comprehend the contextual information available from construction area signs. Such contextual information can be utilized, for example, to determine lane geometries and restrictions for use in enhancing the clear path. During vehicle operation, the processing module 120 can analyze image areas, for example exemplary image area 602 depicted in FIG. 13, for correspondence to the predetermined construction templates using template matching programming, such as the type described hereinabove. The processing module 120 may scan for general outlines of a certain template before initiating more computationally intense processing. For example, the processing module 120 may analyze the image for a sign silhouette before analyzing the image for the type of sign. Identification of a construction template in the field-of-view indicates the vehicle is in a construction area.

Construction area detection analysis can further include analyzing an image 600 to determine image coordinates corresponding to a clear path. Construction templates as described hereinabove may be used to identify construction area indicators corresponding to a clear path boundary between a clear path and a not clear path. Intermittent construction objects scattered on a roadway, including, for example, construction barrels 604 can indicate a clear path boundary 610. The processing module 120 identifies a line of trajectory indicated by the intermittent construction objects to identify the boundary. In one embodiment, points corresponding to a corner of a detected construction objected are connected to determine the trajectory. The clear path boundary 610 represents the demarcation between clear path and not clear path. The construction area detection analysis identifies image areas enclosed by the boundaries as corresponding to a clear path 615. In one embodiment, identification of the clear path boundary can be used to focus the analysis on image area between identified boundaries to increase computational efficiency.

As described herein above, the clear path detection analysis may be augmented with the vehicle detection analysis and the construction area detection analysis. Multiple methods for augmenting the clear path detection analysis are contemplated by the disclosure, including augmenting the clear path detection analysis with both the vehicle detection analysis and the construction area detection analysis. A likelihood analysis may be adopted to incorporate confidence values assigned for both the detected vehicles and features identified using the construction area detection analysis. However, the order of the methods used or disqualification or substitution of one of the methods can be implemented based upon perceived factors affecting efficiency or performance of the methods. For example, an urban environment with rapidly changing traffic conditions or pedestrian traffic may yield particularly poor results for one of the methods. An excess of road debris can be another example affecting one method more than others. Contamination of the image from the camera caused by a spot upon the lens of the camera may similarly cause poor results from one of the methods. Vehicle speed may affect the quality of results from one of the methods. Such factors can be determined experimentally, computationally, or be judged based upon modeling or any other method sufficient to accurately estimate effectiveness of the various clear path methods to determine a clear path based upon the input image. Additionally, methods such as machine learning algorithms or fuzzy logic can be implemented to adapt selection of the methods based upon in-vehicle use of the various clear path methods and the resulting operation of the vehicle. Such operation of the vehicle can be judged in many ways known in the art, such as monitoring an occurrence of operator intervention in control of the vehicle or by monitoring location of lane markers in images describing subsequent control of the vehicle upon the roadway. A number of methods to select among the methods and to adjust selection of the various clear path methods are envisioned, and the disclosure is not intended to be limited to particular exemplary embodiments disclosed herein.

Methods to detect objects around the vehicle and place those objects into a context of a clear path determination including vehicle detection analysis and construction area detection analysis are described above. It will be appreciated that similar methods can be employed determining clear paths or enhancing clear paths based upon detection of other objects in the operating environment of the vehicle. For example, toll booths on an expressway can be detected based upon signs warning of the upcoming booths and recognizable geometry of the booths and vehicle flow through the booths. In such a situation, a clear path can be selectably defined leading to the rear of one of the lines of vehicles going though the booths and limited to the area of the booth until a detected turnpike or electronic signal from the booth indicates that the vehicle is free to proceed. In another example, a driver operating an autonomous or semi-autonomous vehicle could select an option to stop the vehicle for refueling once the fuel tank has been depleted to a set level. In such a situation, a clear path can be defined based upon a perceived available refueling station in the proximity of the vehicle and recognizable geometry of the refueling station as it is approached, including the presence of other vehicles at different pumping stations within the refueling station. A number of exemplary uses of methods to detect objects around the vehicle and place those objects into a context of a clear path determination are envisioned, and the disclosure is not intended to be limited to the particular exemplary embodiments disclosed herein.

Figure 14:
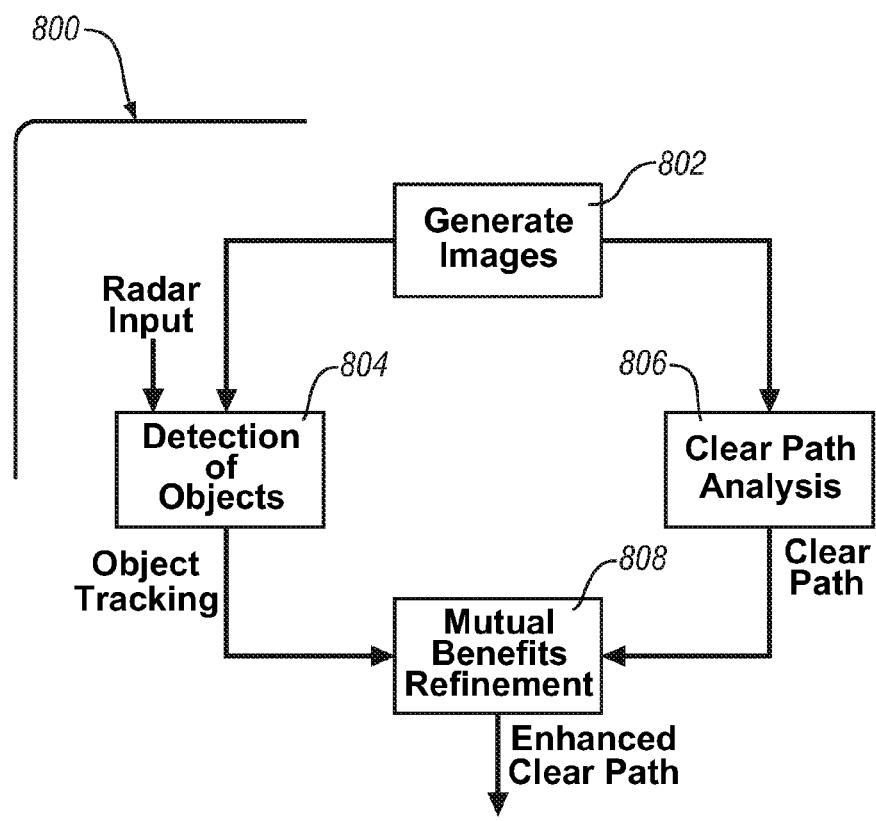
FIG. 14 is a flowchart for an exemplary method for augmenting the clear path detection analysis with detection of objects around the vehicle, in accordance with the disclosure.

FIG. 14 illustrates an exemplary method 800 for augmented clear path detection analysis, in accordance with the present disclosure. The method 800 is illustrated in FIG. 14, and described herein as comprising discrete elements. Such illustration is for ease of description and it should be recognized that the functions performed by these elements may be combined in one or more devices, e.g., implemented in software, hardware, and/or application-specific integrated circuitry. For example, the method 800 may be executed as one or more algorithms in the processing module 120.

During operation, the camera 110 generates an image for analysis in the processing module 120 (802). The processing module 120 applies a parallel processing approach that includes concurrently analyzing the image using the clear path detection analysis and one of the methods for detection of objects around the vehicle described herein, for example, including vehicle detection analysis. The vehicle detection analysis detects objects in the roadway (804). The clear path detection analysis identifies image areas corresponding to a clear path (806). The outputs of steps 804 and 806 are compared and utilized to form an enhanced clear path through mutual benefits refinement in step 808. Detection of the objects in step 804 can simply include object positions or tracks for later comparison to the clear path developed in step 806. Additionally or alternatively, contextual analysis of the detected objects can be performed in one of the illustrated steps, for example, allowing projection of a future location of a detected vehicle or an otherwise undetected lane geometry based upon behavior of detected vehicles. Detected objects can be used in the clear path detection analysis to enhance or refine image areas corresponding to a clear path. In one exemplary embodiment, vehicle motion may be used to infer image coordinates corresponding to a clear path. Referring back to FIG. 12, exemplary inferred image coordinates 502 are inferred based on detected motion of a vehicle. Vehicle motion may be determined using one of multiple methods. An interest point corresponding to the vehicle may be tracked over sequential images. Triangulation methods known in the art may be used to determine vehicle trajectory based upon motion of the vehicle 100 and change in image coordinates of the interest point. LIDAR and radar-based methods may also be used to determine a vehicles motion. Vehicle trajectory may be followed back to determine image areas wherein the detected vehicle recently traversed. Image areas wherein a detected vehicle has recently traversed are likely safe for vehicle travel and thus may appropriately be defined as corresponding to a clear path. Vehicle trajectories can be used to define or augment a clear path by following the other vehicle, or vehicle trajectories, describing a projected future location of the other vehicle, can be used to subtract from a clear path, avoiding potential collision with the other vehicle.

Figure 23:
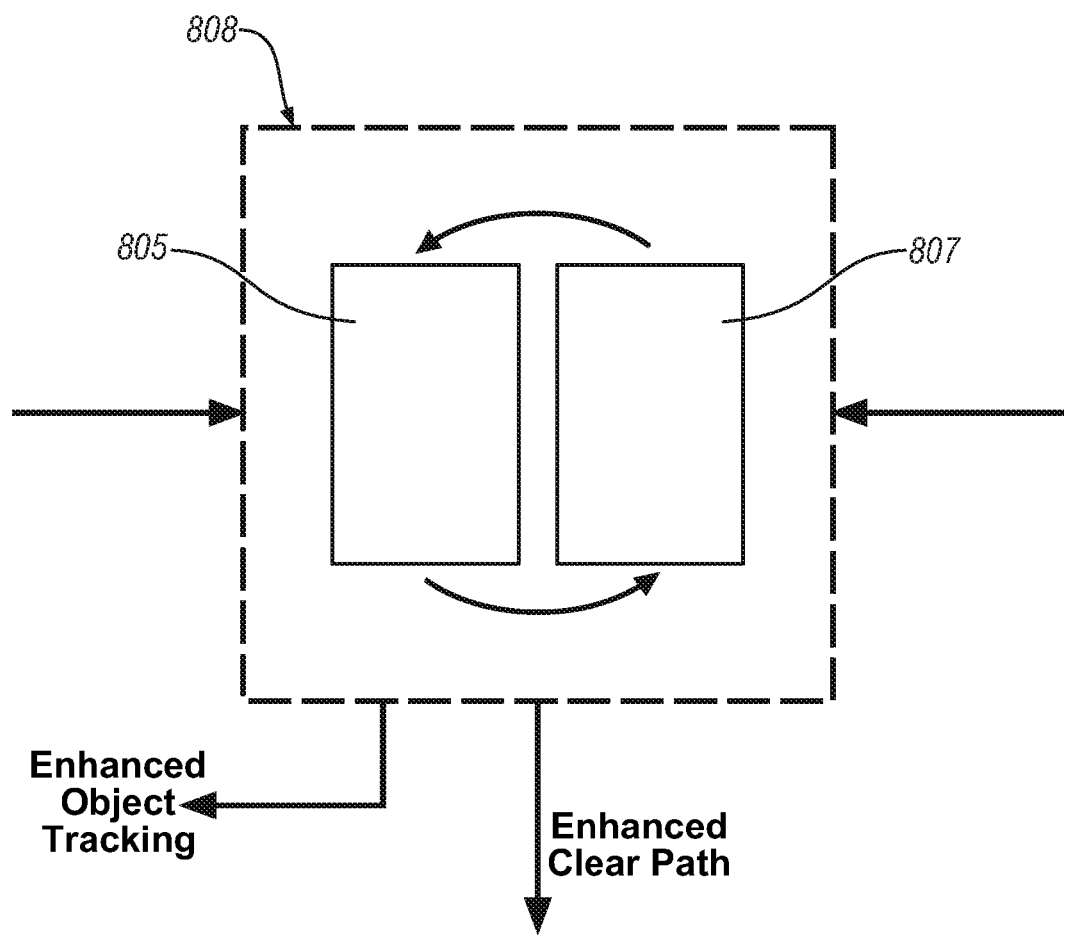
FIG. 23 graphically depicts an exemplary iterative analysis, in accordance with the present disclosure.

Step 808 of FIG. 14 illustrates mutual benefits refinement, inputting a clear path and object location or tracking information, to output an enhanced clear path. As will be appreciated from the above described methods, clear path can benefit from detection of objects around the vehicle, augmenting an understanding of what areas are likely to be a clear path. It will be appreciated that enhanced object location and tracking can similarly be accomplished by analysis of the identified clear path. For example, in a construction area, shapes detected at regular intervals along the border of the clear path can be assumed to be construction barrels or other barriers, and methods to identify the barrels can be focused upon the locations described by the clear path detection. Such an analysis can be iteratively reinforced with subsequent images, building confidence along the route of travel of both the clear path and the location and identification of the tracked object. Additionally, a single image can be iteratively examined, with multiple iterations of clear path analysis and object detection reinforcing analysis of the single image. Such an analysis loop can beneficially refine starting assumptions and results of the analyses. FIG. 23 graphically depicts such an iterative analysis, in accordance with the present disclosure. Step 808 is depicted, including object tracking refinement in step 805 and clear path refinement in step 807. Step 808 outputs both the enhanced clear path, as described above, and additionally exemplary enhanced object tracking information.

In one embodiment of the clear path detection analysis, the detected objects may be utilized in the above described likelihood analysis. The clear path confidence likelihood for each of the images areas are partially based upon an association with the detected objects. As described hereinabove, the likelihood analysis evaluates image areas to assign a clear path confidence likelihood value. Classifiers may be used to increase or decrease the clear path confidence likelihood value based upon features identified in the image area. For example, detected construction barriers or markers may be used as an additional classifier in accordance with the likelihood analysis set forth above to decrease the clear path confidence likelihood of a corresponding image area. Detected vehicles tracked driving through detected construction barriers may increase the clear path confidence likelihood of the image area corresponding to where the vehicles were tracked. Image areas with a clear path confidence likelihood greater than a threshold confidence likelihood are defined as clear path.

The clear path detection analysis may also be used to augment and refine an exemplary vehicle detection analysis. Image areas corresponding to a clear path define image coordinates devoid of detectable vehicles and thus can properly be excluded from the vehicle detection analysis, thereby improving computational efficiency. Similarly, a pocket of not clear path large enough to contain a vehicle within a larger image region of clear path is likely to include a vehicle, and computational resources utilized in vehicle detection or tracking can be focused upon that area.

Construction area indicators can be used in the clear path detection analysis to enhance or refine image areas corresponding to a clear path according to additional exemplary embodiments. In one embodiment, construction area indicators are used to determine image coordinates corresponding to a clear path. Construction area indicators are identified by template matching programming. The processing module 120 identifies a line of trajectory indicated by the intermittent construction objects to identify the clear path boundary. The clear path boundaries are used to determine image coordinates corresponding to a clear path. Image coordinates enclosed by the boundaries are defined as corresponding to a clear path. The image coordinates identified by the construction area detection analysis as corresponding to a clear path can be used by the clear path detection analysis to limit potential image coordinates corresponding to a clear path. In one embodiment, only image coordinates identified by the construction area detection analysis are analyzed by the clear path detection analysis for inclusion on a clear path map.

The clear path detection analysis may also be used to augment and refine the construction area detection analysis. In one embodiment, image coordinates identified by the clear path detection analysis as corresponding to a clear path are excluded from the construction area detection analysis.

It will be appreciated that a plurality of methods detecting objects around the vehicle can be utilized to simultaneously augment or enhance a clear path. According to one exemplary method, an enhanced clear path will include only areas upon a roadway indicated to be clear based upon all available methods. In another exemplary method, an enhanced clear path will be decided according to a likelihood analysis for different areas of an image, and each of the methods can be used to modify the resulting likelihood values for each area of the image. A number of methods to combine a plurality of methods detecting objects around the vehicle and a clear path analysis are envisioned, and the disclosure is not intended to be limited to the particular exemplary embodiments described herein.

The above clear path analysis methods, including patch-based, pixel-based, example-based methods and segmentation-based, utilize a camera device to analyze an image or series of images. Additionally, the methods described to detect objects around the vehicle can include analysis of an image or a series of images. It will be appreciated that the image utilized in the clear path analysis can but need not be the same image utilized in the method to detect objects around the vehicle. For example, different cameras might be utilized based upon the particular requirements of the different analyses.

As mentioned above, processing module 120 may include algorithms and mechanisms to actuate autonomous driving control by means known in the art and not described herein, or processing module 120 may simply provide information to a separate autonomous driving system. Reactions to perceived objects can vary, and include but are not limited to steering changes, throttle changes, braking responses, and warning and relinquishing control of the vehicle to the operator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for detecting a clear path of travel for a host vehicle including fusion of clear path detection by image analysis and detection of an object within an operating environment of the host vehicle, the method comprising:
monitoring an image from a camera device;
analyzing the image through clear path detection analysis to determine a clear path of travel within the image;
monitoring two sets of sensor data describing the object, each set of sensor data comprising a range, a time-rate of change of range, and an azimuth angle of the object;
fusing, over a series of discrete time events, the two sets of sensor data to determine a tracked position and velocity of the object;
analyzing the tracked position and velocity of the object to determine an impact of the object to the clear path, comprising:
extracting a defined area of interest in the image corresponding to the tracked position and velocity of the object,
analyzing the defined area of interest to extract features indicative of the object, and
classifying the extracted features to determine the impact of the object to the clear path;
utilizing the determined impact of the object to describe an enhanced clear path of travel;
when the velocity of the object indicates the object is in motion, identifying a clear path image area, comprising:
determining a previously traversed path travelled by the object based on the tracked position and velocity of the object, and
identifying the clear path image area based on the previously traversed path, the clear path image area being devoid of other objects; and
utilizing the enhanced clear path of travel and the identified clear path image area to navigate the host vehicle.

2. The method of claim 1, wherein monitoring two sets of sensor data describing the object comprises monitoring two sets of sensor data wherein each set describes a range, a time-rate of change of range, and an azimuth angle of another vehicle.

3. The method of claim 2, wherein utilizing the determined impact of the object to describe the enhanced clear path of travel comprises removing from the clear path of travel a position of the other vehicle.

4. The method of claim 2, wherein utilizing the determined impact of the object to describe the enhanced clear path of travel comprises removing from the clear path of travel a projected future position of the other vehicle.

5. The method of claim 2, wherein utilizing the determined impact of the object to describe the enhanced clear path of travel comprises affecting a clear path confidence likelihood for different regions of the image based upon the two sets of sensor data wherein each set describes the range, the time-rate of change of range, and the azimuth angle of another vehicle.

6. The method of claim 1, further comprising:
monitoring sensor data describing a construction area including structures within the construction area.

7. The method of claim 6, wherein utilizing the determined impact of the object to describe the enhanced clear path of travel comprises removing from the clear path of travel the structures within the construction area.

8. The method of claim 6, further comprising:
defining a construction area boundary based upon the sensor data describing the construction area.

9. The method of claim 6, wherein monitoring sensor data describing the construction area comprises utilizing pattern recognition to determine lane instructions; and
determining a lane geometry restriction based upon the lane instructions.

10. The method of claim 6, wherein utilizing the determined impact of the object to describe the enhanced clear path of travel comprises affecting a clear path confidence likelihood for different regions of the image based upon the sensor data describing the construction area.

11. The method of claim 6, wherein analyzing the tracked position and velocity of the object comprises analyzing the tracked position and velocity of another vehicle; and
wherein analyzing the tracked position and velocity of the object to determine the impact of the object to the clear path comprises utilizing the tracked position and velocity of the other vehicle to augment a clear path defined within the construction area.

12. The method of claim 1, wherein monitoring the two sets of sensor data describing the object comprises monitoring data from a camera system.

13. The method of claim 1, wherein monitoring the two sets of sensor data describing the object comprises monitoring data from a system selected from the group consisting of a radar system, a LIDAR system, a vehicle-to-vehicle communications system, a vehicle-to-infrastructure communications system, and an ultrasonic detection system.

14. The method of claim 1, further comprising monitoring sensor data describing a lane geometry; and
wherein analyzing the tracked position and velocity of the object to determine the impact of the object to the clear path is further based upon the lane geometry.

15. The method of claim 1, further comprising utilizing the enhanced clear path of travel to augment subsequent monitoring of sensor data describing the object.

16. The method of claim 1, further comprising utilizing the clear path detection analysis to describe an enhanced location of the object.

17. The method of claim 16, wherein utilizing the clear path detection analysis to describe the enhanced location of the object comprises describing an enhanced location of another vehicle proximate to the host vehicle.

18. The method of claim 16, wherein utilizing the clear path detection analysis to describe the enhanced location of the object comprises describing an enhanced location of a construction area object.

19. Method for detecting a clear path of travel for a host vehicle including fusion of clear path detection by image analysis and detection of an object within an operating environment of the host vehicle, the method comprising:
monitoring an image from a camera device;
analyzing the image through segmentation-based clear path detection analysis to determine a clear path of travel within the image;
monitoring two sets of sensor data describing the object wherein each set of sensor data comprises a range, a time-rate of change of range, and an azimuth angle of the object;
fusing, over a series of discrete time events, the two sets of sensor data to determine a tracked position and velocity of the object;
analyzing the tracked position and velocity of the object to determine an impact of the object to the clear path, comprising:
extracting a defined area of interest in the image corresponding to the tracked position and velocity of the object,
analyzing the defined area of interest to extract features indicative of the object, and
classifying the extracted features to determine the impact of the object to the clear path;
utilizing the determined impact of the object to describe an enhanced clear path of travel;
when the velocity of the object indicates the object is in motion, identifying a clear path image area, comprising:
determining a previously traversed path travelled by the object based on the tracked position and velocity of the object, and
identifying the clear path image area based on the previously traversed path; and
utilizing the enhanced clear path of travel and the identified clear path image area to navigate the vehicle.

20. System for detecting a clear path of travel for a host vehicle including fusion of clear path detection by image analysis and detection of an object within an operating environment of the host vehicle, the system comprising:
a camera device monitoring a view in front of the vehicle; and
a processing module comprising a general-purpose digital computer configured to execute the steps comprising:
monitoring an image from the camera device,
analyzing the image through clear path detection analysis to determine a clear path of travel within the image,
monitoring two sets of sensor data describing the object, each set of sensor data comprising a range, a time-rate of change of range, and an azimuth angle of the object,
analyzing the tracked position and velocity of the object to determine an impact of the object to the clear path, comprising
extracting a defined area of interest in the image corresponding to the tracked position and velocity of the object,
analyzing the defined area of interest to extract features indicative of the object,
classifying the extracted features to determine the impact of the object to the clear path,
utilizing the determined impact of the object to describe an enhanced clear path of travel,
when the velocity of the object indicates the object is in motion, identifying a clear path image area, comprising:
determining a previously traversed path travelled by the object based on the tracked position and velocity of the object, and
identifying the clear path image area based on the previously traversed path;
utilizing the enhanced clear path of travel and the identified clear path image area to navigate the vehicle.

21. The system of claim 20, further comprising a radar imaging system; and
wherein the two sets of sensor data describing the object comprises two sets of data from the radar imaging system describing the object.

* * * * *